(12) United States Patent
Miya et al.

(10) Patent No.: US 6,470,194 B1
(45) Date of Patent: Oct. 22, 2002

(54) BASE STATION WITH IMPROVED DIRECTIVITY USING ADAPTIVE ANTENNA ARRAY RECEPTION

(75) Inventors: Kazuyuki Miya, Kawasaki; Katsuhiko Hiramatsu, Yokosuka, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/272,624

(22) Filed: Mar. 19, 1999

(30) Foreign Application Priority Data

Mar. 31, 1998 (JP) ............................................ 10-105747

(51) Int. Cl.$^7$ ............................... H04B 7/14; H04M 1/00
(52) U.S. Cl. ........................ 455/562; 455/134; 455/25
(58) Field of Search ................................. 455/562, 561, 455/25, 279.1, 132, 134, 135, 136, 138; 342/457

(56) References Cited

U.S. PATENT DOCUMENTS

| | | | | |
|---|---|---|---|---|
| 5,134,715 A | * | 7/1992 | Parl et al. ................... | 455/562 |
| 5,742,911 A | * | 4/1998 | Dumbrill et al. ........... | 455/562 |
| 5,924,040 A | * | 7/1999 | Trompower ................. | 455/562 |
| 6,091,788 A | * | 7/2000 | Keskitalo et al. ........... | 455/562 |
| 6,151,513 A | * | 11/2000 | Petry et al. ................. | 455/562 |

OTHER PUBLICATIONS

"Waveform Equalization Technology For Digital Mobile Communications", pp. 101–116, Triceps Corp., Jun. 1, 1996, ISBN4–88657–801–2.

"Spectral Efficiency Improvement By Base station Antenna Pattern Control For Land Mobile Cellular Systems", by Ohgane, Technical Report of IEICE (RCS93–8, May 1993).

Antenna Engineering Handbook, pp. 200–205, Ohmsha, Ltd., Oct. 30, 1980.

"Adaptive Zone Configuration Using A Circular 8–Element Array Antenna", by Ami Kanazawa et al., Technical Report of IEICE, RCS96–148, Feb. 1997.

"Measuring Reception SIR In DS–CDMA Transmission Power Control Using Pilot System", by Kiyoo and Yasumoyo et al., Technical Report of IEICE, RCS96–74, Aug. 1996.

\* cited by examiner

*Primary Examiner*—Vivian Chin
*Assistant Examiner*—Eliseo Ramos-Feliciano
(74) *Attorney, Agent, or Firm*—Greenblum & Bernstein, P.L.C.

(57) ABSTRACT

The radio communication apparatuses and radio communication methods of the present invention detect the timing of an incoming wave, perform adaptive array antenna reception at the timing of the incoming wave, calculate a new weighting coefficient from the weighting coefficient of the reception result, detect the reception power of the desired wave and SIR level from the weighting coefficient and the received signal, select a weighting coefficient with the greater level and carry out transmission using the weighting coefficient selected above.

11 Claims, 20 Drawing Sheets

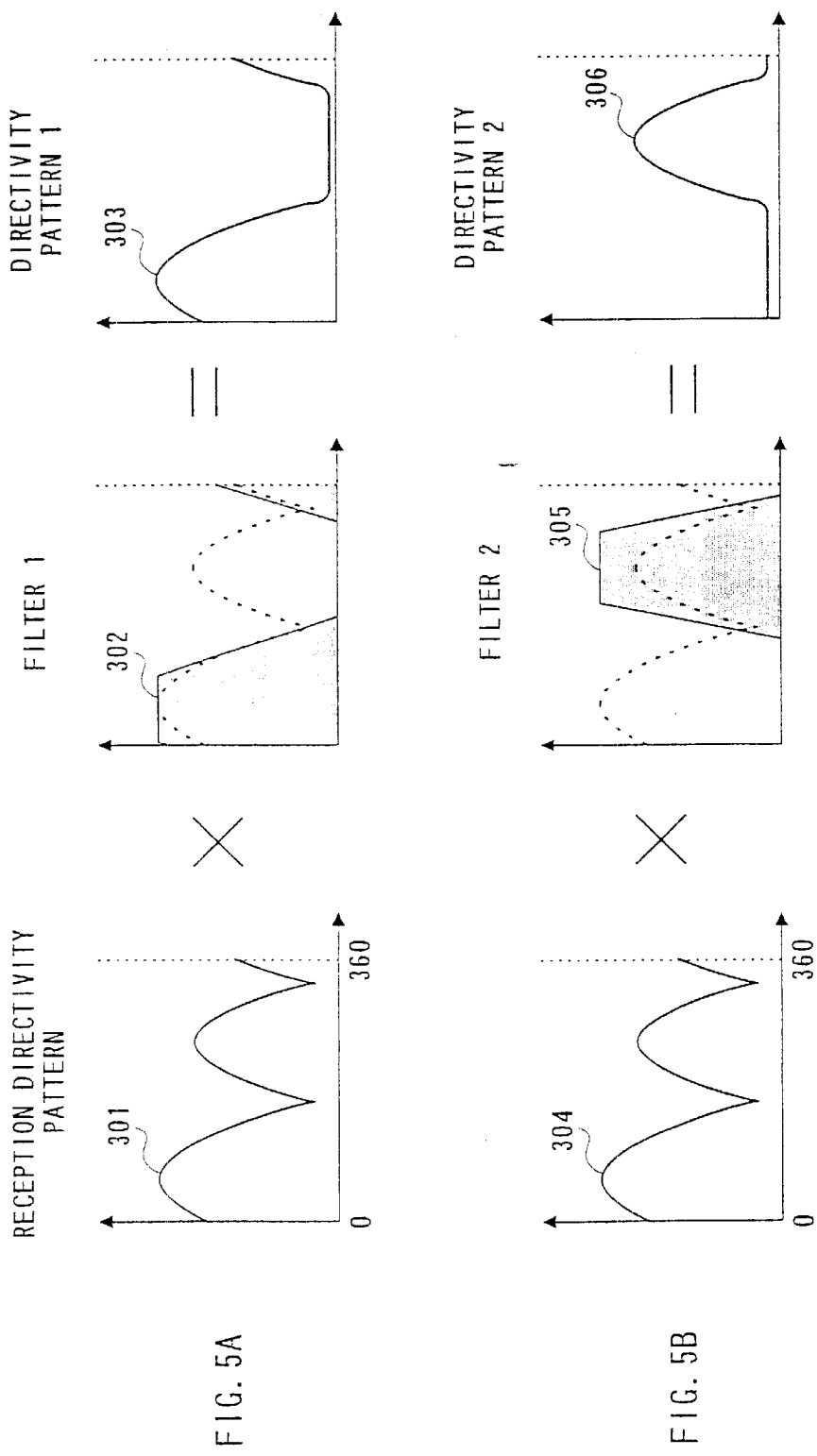

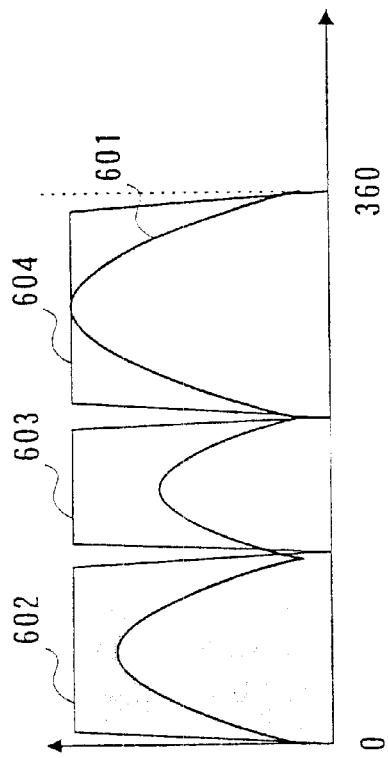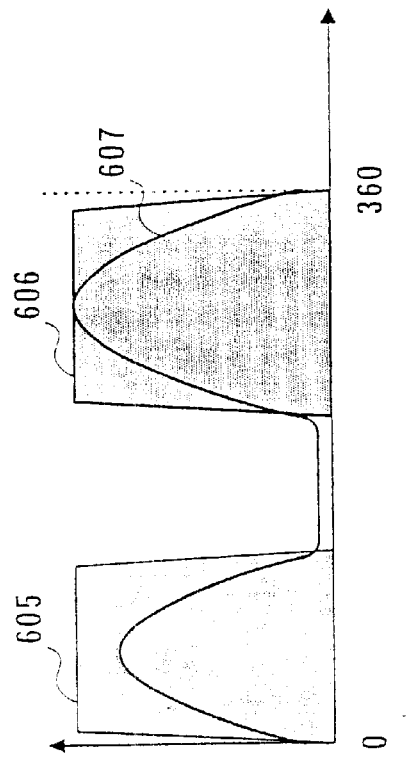
FIG. 8A
FIG. 8B

BASE STATION WITH IMPROVED DIRECTIVITY USING ADAPTIVE ANTENNA ARRAY RECEPTION

BACKGROUND OF THE INVENTION

1. Field of the Invention

The present invention relates to base station apparatuses and radio communication methods used in radio communication systems.

2. Description of the Related Art

A conventional base station apparatus is explained first. FIG. 1 shows a block diagram showing the configuration of a conventional base station apparatus. FIG. 2A and FIG. 2B are schematic drawings showing transmission models in a mobile communication environment. FIG. 4A and FIG. 4B are schematic drawings showing reception directivity patterns of an adaptive array antenna receiver.

Transmission models in radio communications are explained using FIG. 2A and FIG. 2B. Here, by way of example, a case where the number of antennas of radio communication apparatuses (base station apparatuses) 21 and 30 is 3 is explained. FIG. 2A shows the uplink (from a terminal to a base station) and FIG. 2B shows the downlink (from the base station to the terminal).

A signal transmitted from terminal apparatus 25 is reflected by building 26 or mountain 27, etc. and reaches antennas 22 to 24 of base station apparatus 21. Such a transmission path is called "multi-path transmission path," and the technology for compensating multi-path transmission is called "equalization technology." Generally, failing to compensate this multi-path transmission results in deterioration of the communication quality. In this example, suppose that a signal from the building is received with an extremely small delay (generally, one symbol or less). A signal from mountain 27 containing a large delay may therefore be a major factor of deterioration of the communication quality. On the other hand, signals transmitted through antennas 31 to 33 of base station apparatus 30 are reflected by building 36 or mountain 37, etc. and reach antenna 34 of terminal apparatus 35.

In order to suppress multi-path transmission, it is desirable to transmit a signal through transmission path 39. In multi-path transmission paths, the communication quality of transmission path 40 and transmission path 41 changes as the terminal moves. In this case, it is important to detect the direction of an optimal communication quality and carry out transmission focused on that direction.

The operation of the conventional base station apparatus shown in FIG. 1 is explained. Here, by way of example, a case where the number of antennas of the base station apparatus is 3 is explained. Signals received through antennas 1 to 3 are passed through antenna sharing devices 4 to 6, respectively, amplified, frequency-converted and A/D-converted by radio reception circuit 7 and baseband signals or IF signals are extracted from there. If transmission and reception signals have a same frequency (TDD transmission), switches are used instead of sharing devices.

These signals are sent to timing detection section 8. Timing detection section 8 calculates optimal reception timing. The optimal reception timing is calculated, for example, by embedding a pattern known to both the transmitter and receiver in a frame, transmitting it from the transmitter, carrying out A/D conversion by the receiver for a period several or over ten times one-symbol time, performing correlation operation with the known symbol and detecting timing t0 at which great power results from the correlation operation.

This timing t0 is sent to decimation section 9. The decimation section sends the received signal of timing t0 to adaptive array antenna receiver 12. The adaptive array antenna receiver combines the received signals from the three antennas in such a way that the desired wave or SIR reaches a maximum value. The combination result and weighting coefficients used for multiplication of the received signals of the antennas are output. These weighting coefficients form reception directivity. FIG. 4A gives an example of reception directivity. As seen from the drawing, the reception directivity gain in directions shown by arrows 201 and 202 is large, while the gain in the direction shown by arrow 203 is small. FIG. 4B plots the direction (angle) on the vertical axis and reception directivity gain on the vertical axis.

An adaptive array antenna receiver is explained in "Waveform Equalization Technology for Digital Mobile Communications" (pp.101–116, published by Triceps Corporation on Jun. 1, 1996, ISBN4-88657-801-2), etc.

Performing adaptive array antenna processing to extract a desired signal provides directivity for the desired signal, producing a portion with small directivity (called "null") 203 in an unnecessary signal (signal in the same direction as that of the desired signal which arrives at a different time because it takes a different transmission path, or signal from another transmitter). The number of null points is known to be (number of array antennas—1) and when the number of antennas is 3, two null points are formed as shown in FIG. 4A and FIG. 4B.

Then, the transmitting side is explained. Modulator 13 modulates transmission data. Sum-of-products calculator 14 multiplies (generally, complex multiplication) the data by a weighting coefficient which has a same directivity pattern based on the reception weighting coefficient. Generally, since TDD (Time Division Duplex) transmission uses a same radio frequency for both transmission and reception, the same reception weighting coefficient is used for multiplication as the transmission weighting coefficient.

On the other hand, in FDD (Frequency Division Duplex) which uses different radio frequencies between transmission and reception, the directivity pattern will be different if the same reception weighting coefficient is used, and therefore a transmission weighting coefficient is re-created and multiplied based on the weighting coefficient above. The re-creation of the transmission weighting coefficient above is explained in "Spectral efficiency improvement by base station antenna pattern control for land mobile cellular systems" by Ohgane in TECHNICAL REPORT OF IEICE (RCS93-8, 1993-05), etc.

Then, the result of multiplying the weighting coefficient to obtain the same directivity as the reception directivity through re-creation of the transmission weighting coefficient is subjected to frequency conversion and amplification by radio transmission circuit 15 and transmitted from antennas 1 to 3 via antenna sharing devices 4 to 6.

By way of example, FIG. 4C shows the transmission directivity. The drawing shows that the transmission directivity gain is large in the directions shown by arrows 204 and 205, and the signal is transmitted with the same directivity pattern as the reception directivity shown in FIG. 4A. The explanations hereafter will omit the re-creation of the transmission weighting coefficient due to differences in radio spectrum between transmission and reception.

Thus, transmitting signals with the same directivity pattern as the reception directivity pattern based on the reception signal weighting coefficient combined by the adaptive array antenna has the following advantages:

(1) Avoiding transmission in the direction in which an unnecessary signal has arrived allows the transmitting side to compensate the multi-path transmission path. This eliminates the necessity for providing the receiver (terminal side) with a high-level technology such as equalizer.

(2) Avoiding transmission in the direction in which an unnecessary signal has arrived limits the reach of the transmitted radio wave, making it possible to improve the spectral efficiency of the downlink.

(3) Using the reversibility of transmission paths, signals are transmitted through transmission paths on the uplink with greater power of the desired wave or with greater SIR, and thus the power of the desired wave or SIR is greater on the downlink, too.

However, the conventional system has the following problems:

(1) When signals are transmitted on the downlink with the same directivity pattern as that on the uplink, the directivity is directed in directions other than null points (directions in which the desired wave may be included) because of directivity pattern characteristics, which means that transmission power is dispersed in those directions. This may cause the reception power of the desired wave of the communication counterpart (terminal) to deteriorate compared to when signals are transmitted only in a specific direction.

(2) Because of directivity pattern characteristics, the directivity is also directed in directions in which the desired wave may be included, and thus interference with other stations may be greater compared to when signals are transmitted only in a specific direction with an optimum SIR among reception directivity patterns.

Furthermore, in a CDMA system using spread spectrum communications:

(3) Compared to when signals are transmitted only in a specific direction with optimum power of the desired wave or SIR, interference with other stations is greater, and thus the system capacity deteriorates.

SUMMARY OF THE INVENTION

It is an objective of the present invention to provide a base station apparatus capable of preventing deterioration of the reception power of desired radio waves, reducing interference with other stations and at the same time avoiding deterioration of the system capacity.

This objective is achieved by a base station apparatus comprising a reception section for performing adaptive array antenna reception, a first directivity formation section for forming reception directivity from the received signal, and a second directivity formation section for forming new directivity from the reception directivity above which is limited to a specific direction.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 5A and FIG. 5B are drawings showing directivity patterns of the adaptive array antenna of the base station according to Embodiment 1 of the present invention;

FIG. 8A and FIG. 8B are drawings showing directivity patterns of the adaptive array antenna of the base station according to an embodiment of the present invention;

DETAILED DESCRIPTION OF THE PREFERRED EMBODIMENTS

With reference now to the attached drawings, the embodiments of the present invention are explained in detail below. (Embodiment 1)

Figure 1:
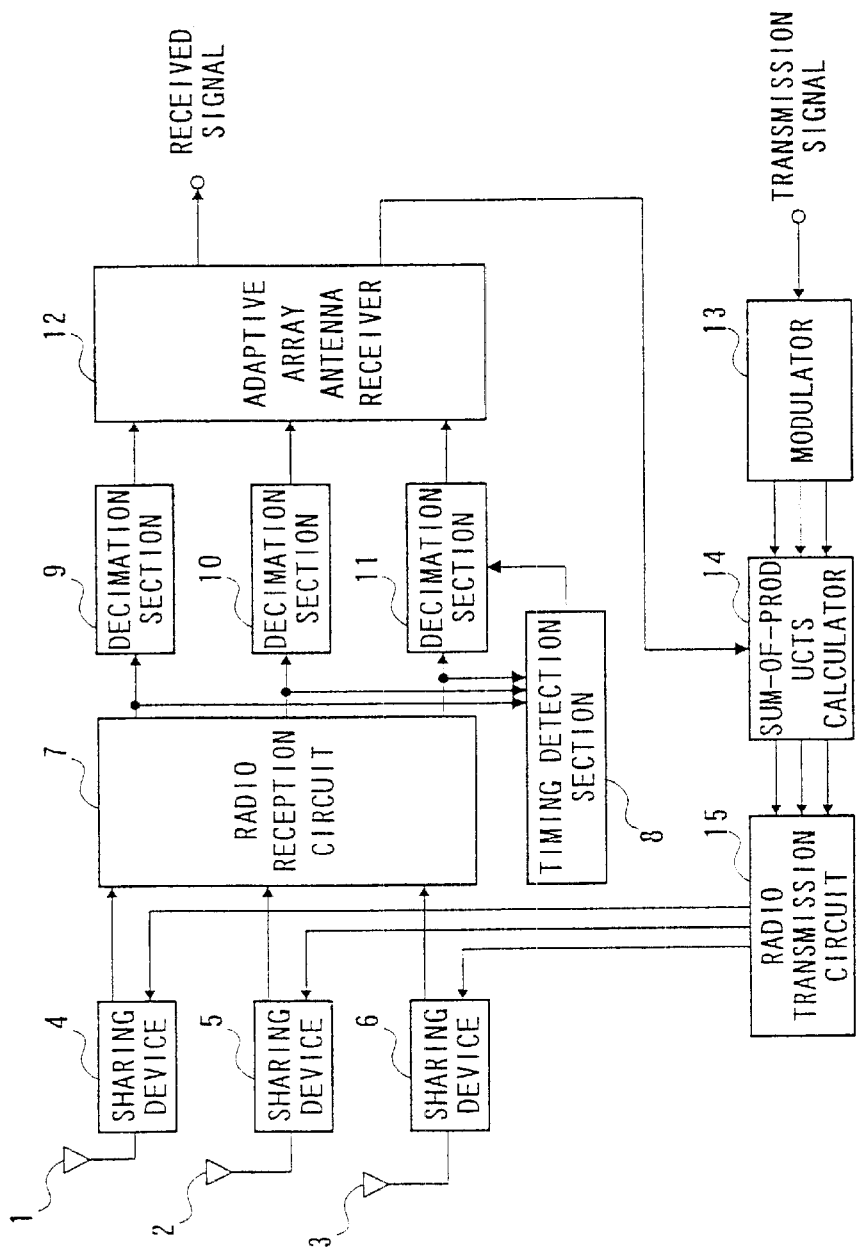
FIG. 1 is a block diagram showing a conventional base station apparatus.
Figure 2B:
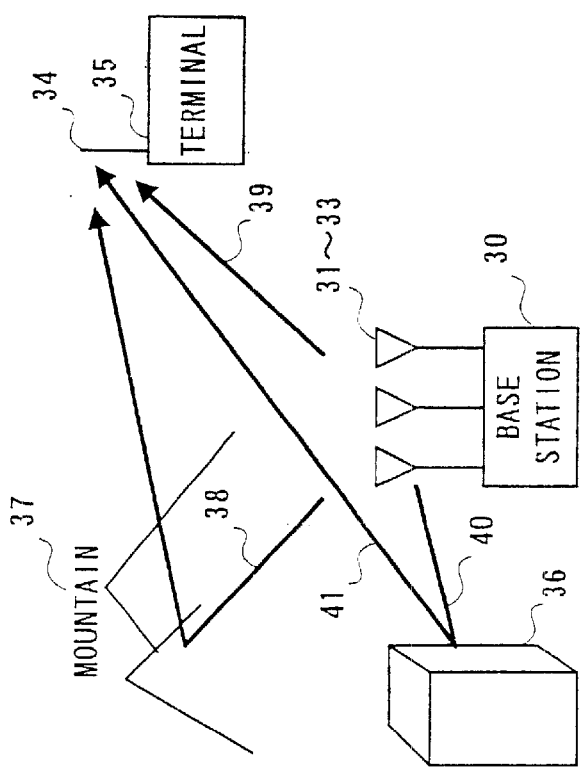
FIG. 2A and FIG. 2B are schematic drawings showing radio transmission models.
Figure 2A:
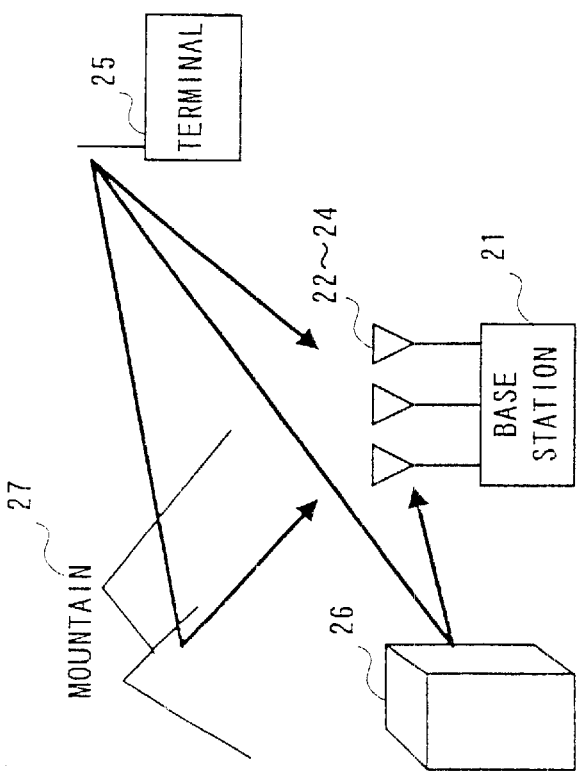
Figure 3:
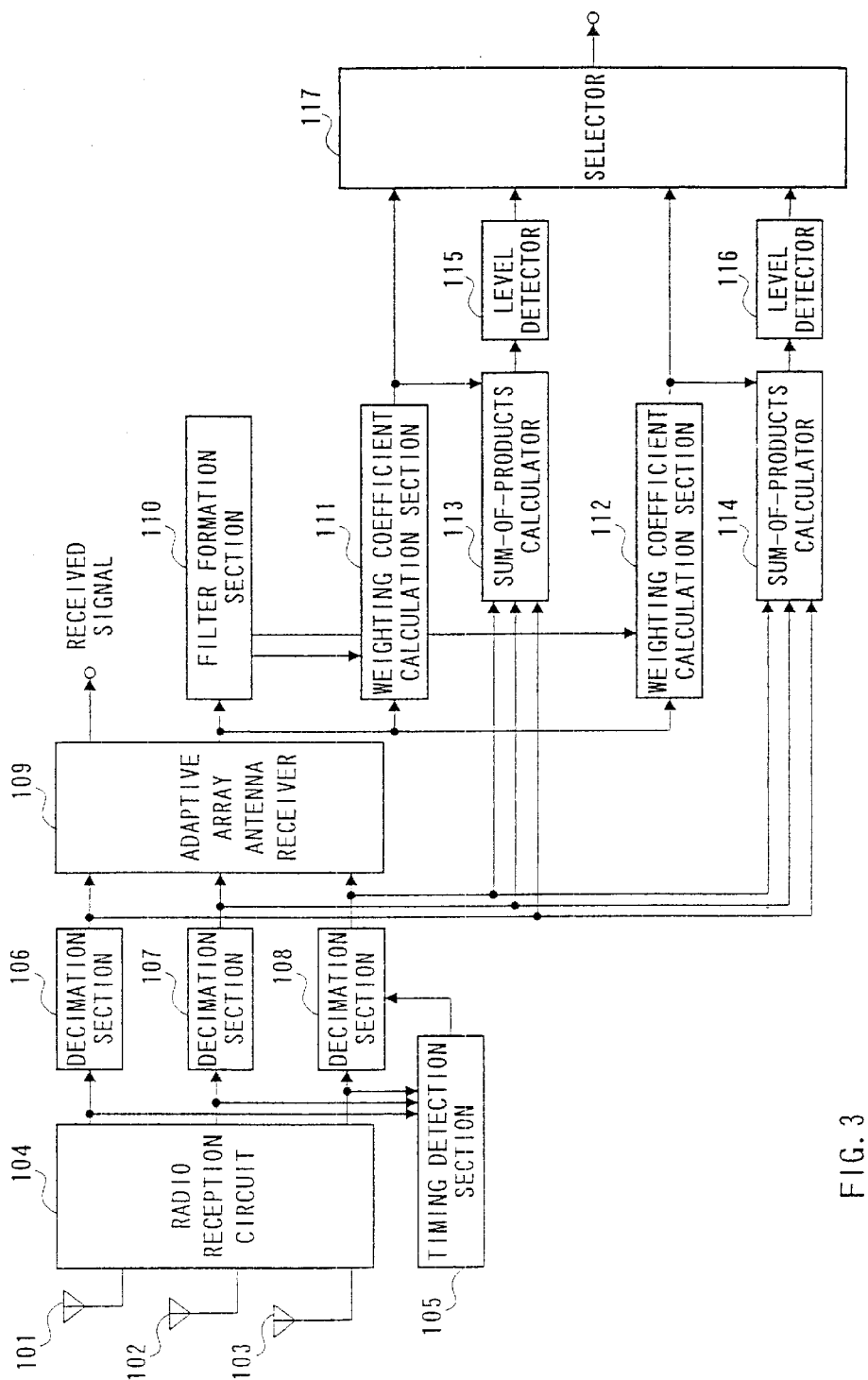
FIG. 3 is a block diagram showing a base station apparatus according to Embodiments 1 to 3 of the present invention.
Figure 4C:
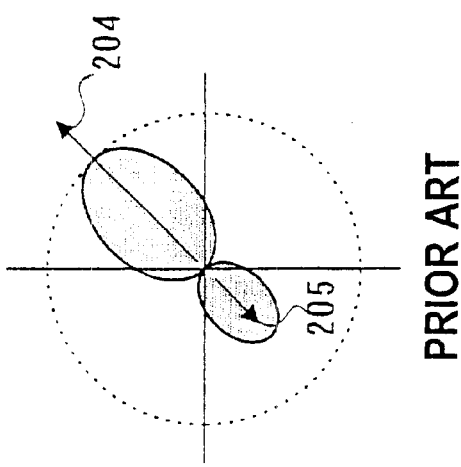
FIG. 4A to FIG. 4C are drawings showing reception directivity of an adaptive array antenna of the base station apparatus according to Embodiment 1 of the present invention and transmission directivity of an adaptive array antenna of the conventional base station apparatus.
Figure 4B:
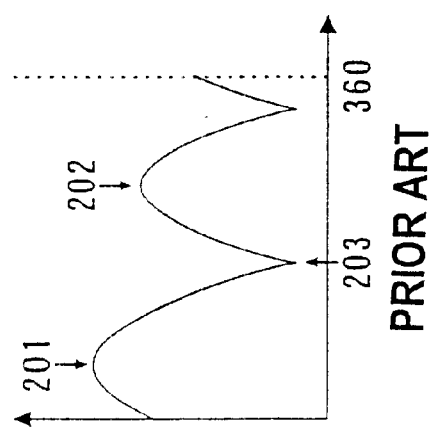
Figure 4A:
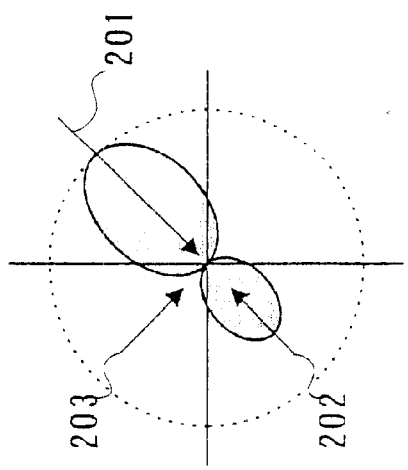

FIG. 3 is a block diagram showing a base station apparatus according to Embodiment 1 of the present invention. FIG. 4A and FIG. 4B show reception directivity of an adaptive array antenna receiver. FIG. 5A and FIG. 5B show directivity patterns of new weighting coefficients in the base station apparatus shown in FIG. 3.

Embodiment 1 is explained using FIG. 3. By way of example, a case where the number of antennas of the base station apparatus is 3 is explained. Signals received through antennas 101 to 103 are amplified, frequency-converted and then A/D-converted by radio reception circuit 104 and baseband signals or IF signals are extracted.

These signals are sent to timing detection section 105. The timing detection section calculates optimal reception timing. The optimal reception timing is calculated, for example, by embedding a pattern known to the transmitter and receiver in a frame, transmitting it from the transmitter, A/D-converting it for a time period several to over ten times a one-symbol time by the receiver, carrying out correlation with the known symbol and detecting timing t0 at which great power results from the correlation operation.

This timing t0 is sent to decimation sections 106 to 108. In the decimation sections the received signals with timing t0 are sent to adaptive array antenna receiver 109. The adaptive array antenna receiver combines the received signals of the three antennas in such a way that the desired wave or SIR reaches a maximum value. Furthermore, the adaptive array antenna receiver outputs the combination result and weighting coefficient. This weighting coefficient forms reception directivity. Examples of reception directivity are shown in FIG. 4A and FIG. 4B.

Filter formation section 110 estimates the incoming direction of a desired wave from the reception weighting coefficient and calculates and outputs the coefficient so that directivity may be directed to a specific direction. These coefficients include coefficients with directivity in a direction with a greater reception directivity gain and coefficients necessary to calculate any directivity, etc. By the way, an example of the directivity formation technology is described in "Antenna engineering handbook" (pp. 200–205, published by Ohmsha, Ltd. on Oct. 30, 1980). When simply focused on N antennas placed rectilinearly at regular intervals (d), directivity can be expressed as shown in expressions (1) to (3) below:

$$E(u) = \sum_{n=0}^{N-1} I_n \exp(jnu) \quad (1)$$

$$= \sum_{n=0}^{N-1} I_n \exp(-jnkd\cos\theta_0)\exp(jnkd\cos\theta)$$

$$= \sum_{n=0}^{N-1} I'_n \exp(jnkd\cos\theta)$$

$$u = kd(\cos\theta - \cos\theta_0) \quad (2)$$

$$I_n' = I_n \exp(-jnkd\cos\theta_0) \quad (3)$$

Where, In' is a current given to the nth antenna (a complex number which has amplitude and phase); k: number of radio waves; $\theta_0$: direction to which directivity is to be directed; $\theta$: variable to describe directivity. For the sake of simplicity, suppose that In is in-phase and of a same amplitude, that is, In=1.0. Giving $\exp(-jnkd\cos\theta_0)$ to each antenna allows directivity to be directed toward $\theta_0$. From this, it is obvious that in order to calculate a filter coefficient which will have directivity in a specific direction, it is not always necessary to determine it only based on the direction of the incoming desired wave estimated from the reception weighting coefficient, but it is also possible to determine it using advance information such as positional information of the self station and interference station and transmission environment.

Weighting coefficient operation sections(W) 111 and 112 calculate new weighting coefficients by multiplying directivity obtained from the weighting coefficients from the adaptive array antenna receiver and the filter coefficient, respectively. FIG. 5A shows that a new weighting coefficient with directivity pattern 303 is obtained by multiplying reception directivity pattern 301 of the weighting coefficient through adaptive array reception by directivity filter coefficient 302. FIG. 5B also shows that a new weighting coefficient with directivity pattern 306 is obtained by multiplying reception directivity pattern 304 of the weighting coefficient through adaptive array reception by directivity filter coefficient 305.

The above example shows a case where a weighting coefficient with a new directivity pattern is calculated by multiplying a reception directivity pattern by a directivity filter coefficient. However, there are also other examples of the directivity formation technology such as the method described in "Adaptive zone configuration using a circular 8-element array antenna" by Kanazawa and Iwama, et al. (TECHNICAL REPORT OF IEICE RCS-96-148, 1997-02). That is, one is an analytical technique using Fourier series expansion and the other is a technique for obtaining an optimal solution using a least-square estimation algorithm. When such a directivity formation algorithm is used, filter formation section 110 estimates the direction of each lobe and null point from the reception weighting coefficient and calculates and outputs a coefficient necessary to create directivity (lobe) in a specific direction. Weighting coefficient operation sections 111 and 112 calculate new weighting coefficients from the directivity formation algorithm using the directivity obtained from the weighting coefficient from the adaptive array antenna receiver and the above coefficient.

In the base station apparatus shown in FIG. 3, sum-of-products calculators(S-P calculator) 113 and 114 obtain sum-of-products of the received signal and weighting coefficient above. This means that array reception of the received signal is performed with two new directivity patterns. Level detection sections 115 and 116 measure the reception power of the desired signal of the received signals combined by the array antenna. Selector 117 selects a weighting coefficient with a greater reception level of the desired wave detected. Here, two new weighting coefficients are calculated, compared and selected. It goes without saying, however, that this number can be determined according to the number of array antennas, transmission environment and hardware scale.

Furthermore, when the selector has selected a plurality of weighting coefficients, it is also possible to combine those weighting coefficients. That is, it is possible to combine a plurality of directivity patterns and use that combined directivity pattern. The same applies to the embodiments that follow.

An example of calculating the reception power of the desired wave is described in "Measuring reception SIR in DS-CDMA transmission power control using pilot symbol" by Kiyoo and Yasumoto, et al. (TECHNICAL REPORT OF IEICE, RCS96-74, 1996-08). That is, the reception power of the desired wave can be expressed in expression (4) below.

$$S = \left| \frac{1}{N} \sum_{i=0}^{N} R_i \right|^2 \quad (4)$$

Where, S is reception power of the desired wave; N: number of symbols in the measuring section; Ri: reception symbol after quadrant detection in complex notation.

As shown above, a weighting coefficient with a new directivity pattern is calculated from the weighting coefficients of the received signals combined by the adaptive array antenna and the weighting coefficient corresponding to the maximum reception power of the desired wave is selected as the weighting coefficient for transmission, which gives the following effect:

(1) This method identifies the direction of the incoming desired wave, in other words, it selects from among the directions possibly containing the desired wave the one that is sure to contain the desired wave and carries out transmission focused on the direction corresponding to the maximum reception power of the desired wave, which makes it possible to improve the reception power of the desired wave of the communication counterpart (terminal). This allows communications with optimal directivity.

(Embodiment 2)

The radio communication method or base station apparatus according to Embodiment 1 carries out transmission using directivity corresponding to the maximum reception power of the desired wave. However, if the SIR of the received signal from the direction corresponding to the maximum power of the desired wave is inferior to SIRs in non-selected directions, the reception power of the desired wave of the communication counterpart (terminal) may be improved, but the reception SIR may deteriorate, which will deteriorate the line quality. Moreover, transmission with the same power in directions with inferior SIR can cause strong interference with other stations.

Therefore, Embodiment 2 is intended to improve the SIR of the communication counterpart (terminal) and at the same time reduce interference with other stations by carrying out transmission with directivity corresponding to the maximum reception SIR.

The configuration of the base station apparatus according to Embodiment 2 of the present invention is the same as that shown in FIG. 3. FIG. 3 is therefore used to explain Embodiment 2. By way of example, a case where the number of base station apparatus antennas is 3 is explained. Processing of up to weighting coefficient calculators 111 and 112 is the same as that in Embodiment 1, and its explanation is therefore omitted.

In FIG. 3, sum-of-products calculators 113 and 114 obtain sum-of-products of the received signals and weighting coefficients. This means that array reception of the received signals is performed with two new directivity patterns. Level detection sections 115 and 116 measure the reception power of the desired signal of the received signals combined by the array antenna. Selector 117 selects the weighting coefficient corresponding to the greater reception SIR detected. Here, two new weighting coefficients are calculated, compared and selected. It goes without saying, however, that this number can be determined according to the number of array antennas, transmission environment and hardware scale.

An example of calculating the reception power of the desired wave is described in "Measuring reception SIR in DS-CDMA transmission power control using pilot symbol" by Kiyoo and Yasumoto, et al. (TECHNICAL REPORT OF IEICE, RCS96-74, 1996-08). That is, the reception power of the desired wave can be expressed in expression (4) and the interference power can be expressed in expression (5) below. The reception SIR can be obtained from expression (6).

$$I = \frac{1}{N_P} \sum_{i=1}^{N_P} |R_{AV} - R_i|^2 \quad (5)$$

Where, S is the reception power of the desired wave; N: number of symbols in the measuring section; Ri: reception symbol in complex notation after quadrant detection. I is the interference power, NP: number of pilot symbols which are known symbols; RAV: average in the pilot section of Ri.

As shown above, a weighting coefficient with a new directivity pattern is calculated from the weighting coefficients of the received signals combined by the adaptive array antenna and the weighting coefficient corresponding to the maximum reception SIR is selected as the weighting coefficient for transmission, which gives the following effect:

(1) Transmission focused on the direction with an optimal SIR makes it possible to reduce interference with other stations, improving the utilization efficiency of radio spectrum.

(Embodiment 3)

The radio communication methods or base station apparatuses according to Embodiment 1 and Embodiment 2 carry out transmission using directivity corresponding to the maximum reception power of the desired wave or reception SIR. However, when selected with the power of the desired wave, although the reception power of the desired wave of the communication counterpart (terminal) is improved, the reception SIR may deteriorate and there may be strong interference with other stations. On the other hand, when selected with the reception SIR, although the reception SIR of the communication counterpart (terminal) is improved and interference with other stations can be reduced, the reception power of the desired wave is reduced on the contrary, increasing the probability of deteriorating the line quality in terms of SNR (Signal to Noise Ratio).

Therefore, Embodiment 3 is intended to improve the SIR of the communication counterpart (terminal), reduce interference with other stations and at the same time improve the reception power of the desired wave by carrying out transmission after selecting directivity from the both results of the reception power of the desired wave and reception SIR.

The configuration of the base station apparatus according to Embodiment 3 of the present invention is the same as that shown in FIG. 3. FIG. 3 is therefore used to explain Embodiment 3. In FIG. 3, sum-of-products calculators 113 and 114 are the same as those in Embodiment 1 in processing of up to carrying out sum-of-products of the received signals and weighting coefficients. Level detection sections 115 and 116 measure the reception power of the desired signal of the received signals combined by the array antenna and reception SIR. Selector 117 selects a weighting coefficient from the results of the reception power of the desired wave and reception SIR. Suppose that the reception power of the desired wave and reception SIR calculated by level detection section 115 are S1 and SIR1, respectively, and the reception power of the desired wave and reception SIR calculated by level detection section 116 are S2 and SIR2, respectively. Also suppose that the weighting coefficients are W1 and W2 and the weighting coefficient to be selected is Wout.

One possible example of selection is shown below, where S threshold is a threshold for the reception power.

| | |
|---|---|
| if \|S1-S2\| ≦ S threshold and S I R1 > S I R2 then out = W1 | |
| if \|S1-S2\| ≦ S threshold and S I R1 ≦ S I R2 then out = W2 | |
| if \|S1-S2\| > S threshold and S1 > S2 | then out = W1 |
| if \|S1-S2\| > S threshold and S1 < S2 | then out = W2 |

Here, two new weighting coefficients are calculated, compared and selected. It goes without saying, however, that this number can be determined according to the number of array antennas, transmission environment and hardware scale.

As shown above, a weighting coefficient with a new directivity pattern is calculated from the weighting coefficients of the received signals combined by the adaptive array antenna and is selected from the results of the reception power of the desired wave and the reception power SIR as the weighting coefficient for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave, transmission focused on the direction corresponding to the maximum reception power of the desired wave allows improvements of the reception power of the desired wave of the communication counterpart (terminal).

(Embodiment 4)

The radio communication method or base station apparatus according to Embodiment 3 carries out transmission by selecting optimal directivity from the reception power of the desired wave and reception SIR. However, if there is a considerable difference between the comparison result by the power of the desired wave and the comparison result by the reception SIR, for example, suppose:

|S1–S2|>Sthreshold and S1>S2 and |SIR 1–SIR 2|>SIR threshold and SIR 1<SIR 2.

Where, S threshold is a threshold value for the reception power and SIR threshold is a threshold value for SIR.

At this time, when selected with the power of the desired wave, although the reception power of the desired wave of the communication counterpart (terminal) is improved, the reception SIR may greatly deteriorate and there may be strong interference with other stations. On the other hand, when selected with the reception SIR, although the reception SIR of the communication counterpart (terminal) is improved and interference with other stations can be reduced, the reception power of the desired wave is greatly reduced, deteriorating the line quality.

Therefore, Embodiment 4, by adding a coefficient with the same directivity pattern as the reception directivity as a weighting coefficient candidate to be selected, is intended to select appropriate directivity from the results of both the reception power of the desired wave and reception SIR according to variations in the transmission environment, etc., improve the SIR of the communication counterpart (terminal), reduce interference with other stations and at the same time improve the reception power of the desired wave.

Figure 6:
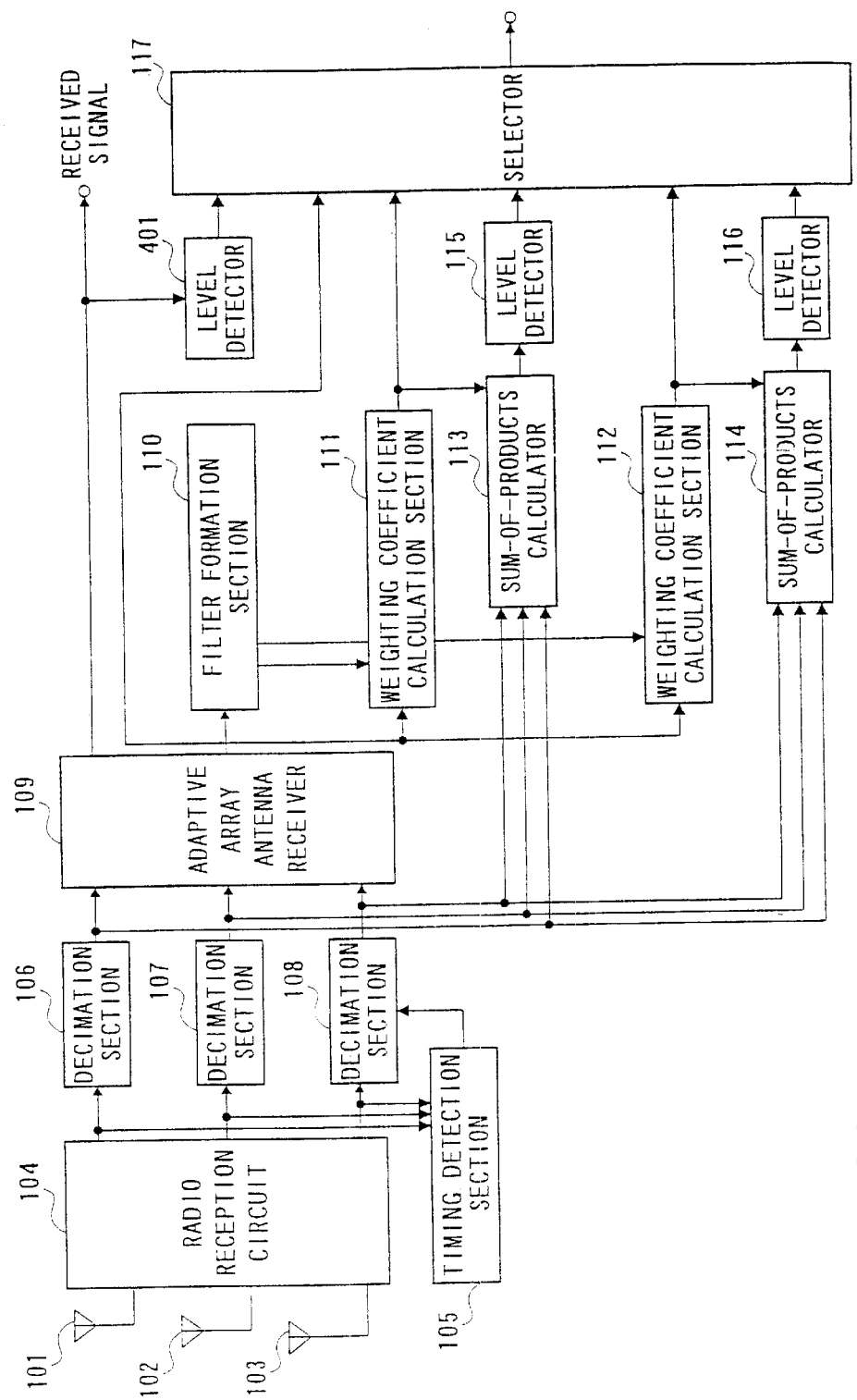
FIG. 6 is a block diagram showing a base station apparatus according to Embodiment 4 of the present invention.

FIG. 6 is a block diagram showing a base station apparatus according to Embodiment 4 of the present invention. In FIG. 6, the same parts as those in FIG. 3 are numbered identically and their explanations are omitted.

The base station apparatus shown in FIG. 6 comprises level detector 401 that performs level detection of the received signal from adaptive array antenna receiver 109. Processing of up to weighting coefficient calculators 111 and 112 is the same as that in Embodiment 1 and their explanations are omitted.

In FIG. 6, sum-of-products calculators 113 and 114 obtain sum-of-products of the received signals and weighting coefficients above. This means that array reception of the received signal is performed with two new directivity patterns. Level detection sections 115 and 116 measure the reception power of the desired signal of the received signal and reception SIR of the received signals combined by the array antenna. On the other hand, level detection section 401 measures the reception power of the desired signal and reception SIR of the received signals combined by the array antenna.

Selector 117 selects a weighting coefficient from the results of the reception power of the desired wave and reception SIR. Suppose that the reception power of the desired wave and reception SIR calculated by level detection section 401 are S0 and SIR0, respectively, and the reception power of the desired wave and reception SIR calculated by level detection section 115 are S1 and SIR1, and the reception power of the desired wave and reception SIR calculated by level detection section 116 are S2 and SIR2. Also suppose that the weighting coefficients are W0, W1 and W2 and the weighting coefficient to be selected is Wout. One possible example of selection is shown below. Where, S threshold is a threshold for the reception power and SIR threshold is a threshold for SIR.

if |S1–S2|≦S threshold and SIR 1>SIR 2 then out=W1
if |S1–S2|≦S threshold and SIR 1≦SIR 2 then out=W2
if |S1–S2|>S threshold and |SIR 1–SIR 2|≦SIR threshold
{

| | |
|---|---|
| if S1 > S2 | then Wout = W1 |
| if S1 < S2 | then Wout = W2 |

}
if |S1–S2|>S threshold and |SIR 1–SIR 2|>SIR threshold
{

| | |
|---|---|
| if S1 > S2 and S I R1 > S I R2 | then Wout = W1 |
| if S1 < S2 and S I R1 < S I R2 | then Wout = W2 |
| if S1 > S2 and S I R1 < S I R2 | then Wout = W0 |
| if S1 < S2 and S I R1 > S I R2 | then Wout = W0 |

}

Here, two new weighting coefficients are calculated, compared and selected. It goes without saying, however, that this number can be determined according to the number of array antennas, transmission environment and hardware scale.

As shown above, a weighting coefficient with a new directivity pattern is calculated from the weighting coefficients of the received signals combined by the adaptive array antenna and is selected from the results of the reception power of the desired wave and the reception power SIR as the weighting coefficient for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave but there is no significant difference in the SIR, transmission focused on the direction corresponding to the maximum reception power of the desired wave allows improvements of the reception power of the desired wave of the communication counterpart (terminal).

(3) If there is a significant difference in both the reception power of the desired wave and SIR, and if the large/small tendency is consistent between the reception power of the desired wave and SIR, transmission is carried out focused on the direction corresponding to the maximum reception power of the desired wave and if it is not consistent, transmission is carried out with the same directivity pattern as the reception directivity, which will prevent either the reception power of the desired wave or SIR from extremely deteriorating.

(Embodiment 5)

The radio communication methods or base station apparatuses according to Embodiments 1 to 4 carry out transmission by selecting optimal directivity from the reception power of the desired wave and reception SIR. At this time, only one weighting coefficient is selected in the weighting coefficient selector.

When selecting the optimal directivity from the reception power of the desired wave and reception SIR, it is however not necessary to limit the directivity to only one incoming direction, but it would rather be preferable to select a weighting coefficient with directivity in a plurality of directions. Naturally, the directivity determined by the one weighting coefficient selected above can also be directed in a plurality of directions, with its weighting coefficient not necessarily limited to a specific one direction.

However, comparing/selecting directivity by also considering a coefficient with directivity in a plurality of directions rather than comparing/selecting new directivity in only one direction would increase the number of candidate weighting coefficients to be compared, resulting in an enormous scale of operations. For example, when the number of antennas is 4 and there are 3 null points with respect to the directivity of the weighting coefficient obtained through adaptive array reception, if new directivity is limited to one direction, an optimal coefficient is selected by calculating 3 new weighting coefficients and detecting and comparing levels upon each array reception. On the other hand, if two directions are made available rather than limiting new directivity to only one direction, 3 combinations (3C2=3) of coefficients will be additionally required and a total of 6 weighting coefficients need to be compared and selected.

Therefore, Embodiment 5 does not limit the number of weighting coefficients to be selected to 1, but allows a plurality of weighting coefficients to be selected and makes it possible to calculate a weighting coefficient with directivity combined from directivity patterns of a plurality of weighting coefficients selected. In this way, new directivity is compared limited to one direction and if more than one candidate is selected, a series of calculations above (calculation of weighting coefficient/array reception operation and level detection/comparison) can be reduced by calculating a weighting coefficient with combined directivity. The aforementioned example applies to a case where 3 new weighting coefficients limited to one direction are calculated and when 2 of the results of level detection are selected, weighting coefficients with directivity in the two directions are calculated and output.

Figure 7:
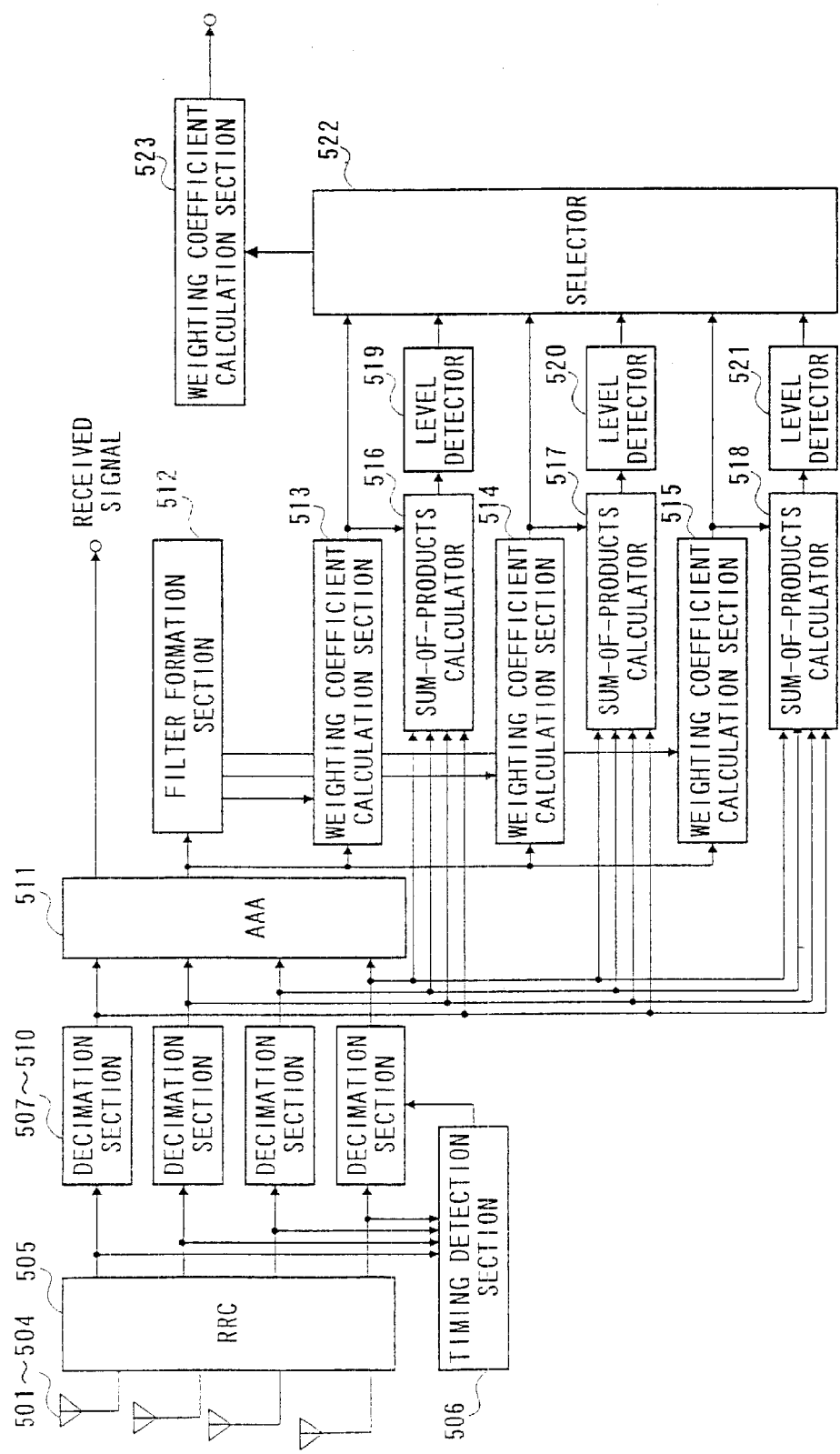
FIG. 7 is a block diagram showing a base station apparatus according to Embodiment 5 of the present invention.

FIG. 7 is a block diagram showing a base station apparatus according to Embodiment 5 of the present invention. Embodiment 5 is explained with reference to FIG. 7. By way of example, a case where the number of antennas of the base station apparatus is 5 is explained. Signals received through antennas 501 to 504 are amplified, frequency-converted and then A/D-converted by radio reception circuit (RRC) 505 and baseband signals or IF signals are extracted. These signals are sent to timing detection section 506. The timing detection section calculates optimal reception timing. The optimal reception timing is calculated as described above. The reception directivity at this time is shown in FIG. 8A. The operations of decimation sections 507 to 510, adaptive array antenna receiver(AAA) 511 and filter formation section 512 are the same as those in Embodiment 1.

Weighting coefficient calculators 513 to 515 calculate new weighting coefficients by multiplying directivity obtained from the weighting coefficient from the adaptive array antenna receiver and filter coefficient, respectively. FIG. 8A shows that a new weighting coefficient with 3 kinds of directivity is obtained by multiplying reception directivity pattern 601 through adaptive array reception by directivity filter coefficients 602 to 604.

The above example shows a case where a weighting coefficient with a new directivity pattern is calculated by multiplying a reception directivity pattern by a directivity filter coefficient. However, there are also other examples of the directivity formation technology such as the method described in "Adaptive zone configuration using a circular 8-element array antenna" by Kanazawa and Iwama, et al. (TECHNICAL REPORT OF IEICE RCS-96-148, 1997-02).

That is, one is an analytical technique using Fourier series expansion and the other is a technique for obtaining an optimal solution using a least-square estimation algorithm. When such a directivity formation algorithm is used, filter formation section 512 estimates the direction of each lobe and null point from the reception weighting coefficient and calculates and outputs a coefficient necessary to create directivity (lobe) in a specific direction. Weighting coefficient operation sections 513 to 515 calculate new weighting coefficients by the directivity formation algorithm using the directivity obtained from the weighting coefficient through the adaptive array antenna receiver and the above coefficient.

In FIG. 7, sum-of-products calculators 516 to 518 obtain sum-of-products of the received signals and weighting coefficients above. This means that array reception of the received signal is performed with three new directivity patterns. Level detection sections 519 to 521 measure the reception power of the desired signal of the received signals combined by the array antenna and reception SIR.

Selector 522 selects a weighting coefficient from the results of the reception power of the desired wave and reception SIR. Here, suppose two weighting coefficients, not one, have been selected. As for the number of weighting coefficients to be selected, it is possible to set a high limit and select a value from the results of the reception power of the desired wave above and reception SIR within the range. At this time, weighting coefficient operation section 523 calculates and outputs a weighting coefficient with directivity combined from that of the two selected weighting coefficients. For example, as shown in FIG. 8B, directivity patterns 605 and 606 of the two selected directions of the three directivity patterns shown in FIG. 8A are combined into directivity pattern 607 and a weighting coefficient having this directivity pattern 607 is calculated.

The implementation shown in FIG. 7 is further provided with weighting coefficient operation section 523 as a section for calculating directivity patterns of the selected two weighting coefficients and weighting coefficients having the directivity combined from those directivity patterns. However, the above calculations can also be performed without providing any additional configuration section.

Figure 9:
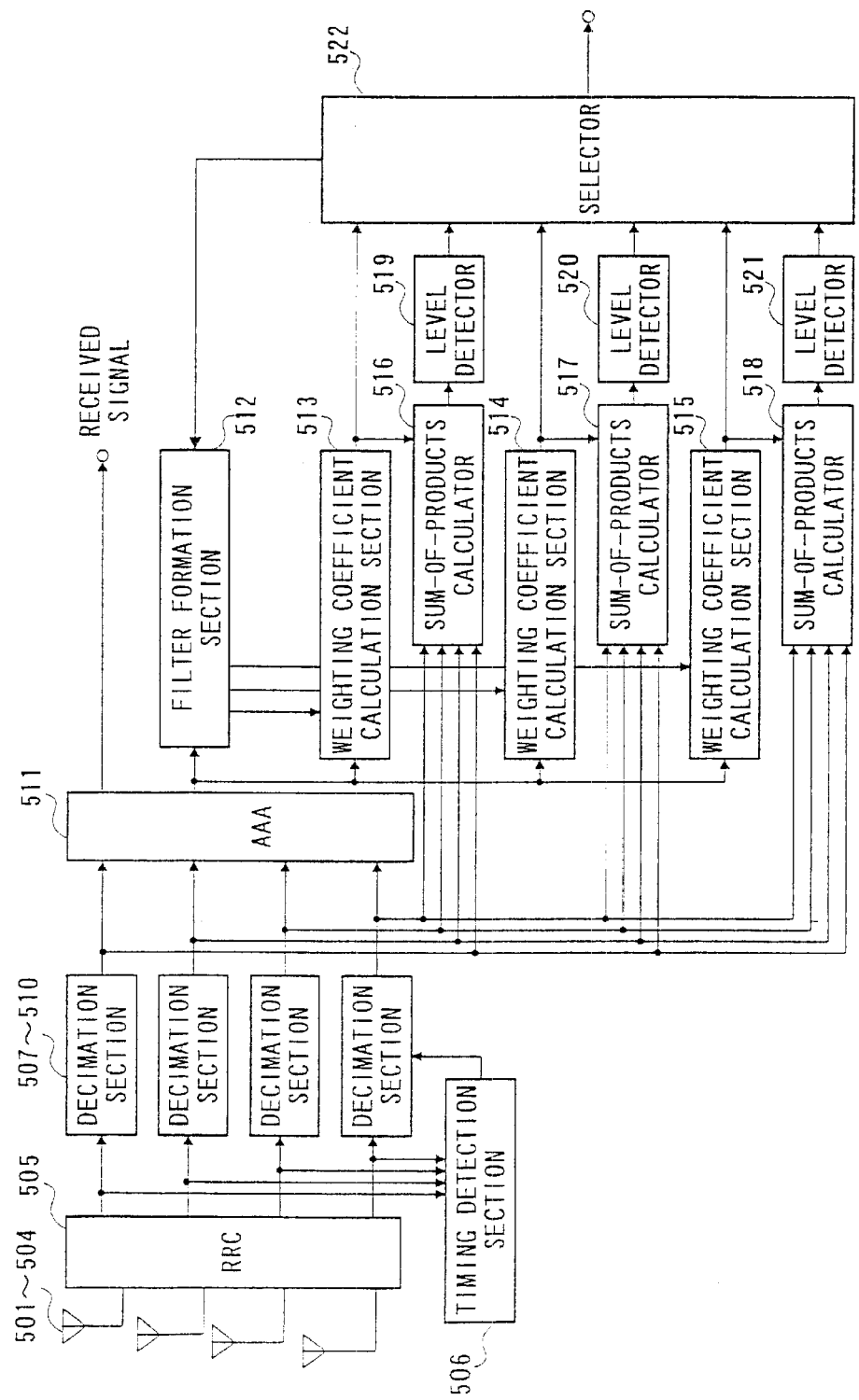
FIG. 9 is a block diagram showing a base station apparatus according to Embodiment 5 of the present invention.

FIG. 9 shows a configuration example. In FIG. 9, the operation of up to selector 522 is the same as that in FIG. 7. Therefore, the operations of sections after selector 522 are explained. That is, selector 522 selects a weighting coefficient from the results of the reception power of the desired wave and reception SIR. At this time, suppose that two coefficients have been selected as in the case of FIG. 7. As for the number of weighting coefficients to be selected, it is possible to set a high limit and select a value from the results of the reception power of the desired wave above and reception SIR within the range.

At this time, if more than one weighting coefficient is selected, filter formation section 512 calculates and outputs a coefficient necessary to calculate a filter coefficient which combines the previous two directivity patterns or weighting coefficient having the combined directivity based on the selection information signal. Then, weighting coefficient operation section 513, for example, calculates a new weighting coefficient using the directivity obtained from the weighting coefficient by the adaptive array antenna receiver and the coefficient above, and outputs it through selector 522.

Here, three new weighting coefficients are calculated, compared and selected. It goes without saying, however, that this number can be determined according to the number of array antennas, transmission environment and hardware scale. The level detection circuit measures the reception power of the desired wave and reception SIR, but it is obvious that it is possible to measure either one and select the weighting coefficient based on the measurement result.

As shown above, a weighting coefficient with a new directivity pattern is calculated from the weighting coefficients of the received signals combined by the adaptive array antenna and more than one weighting coefficient is made available from the results of the reception power of the desired wave and reception SIR without limiting the number of weighting coefficients to be selected for transmission to 1, and if more than one weighting coefficient is selected, it is allowed to calculate a weighting coefficient with directivity combining their respective directivity patterns, which gives the following effects:

(1) It is possible to carry out transmission with optimal directivity based on the reception power of the desired wave and reception SIR.

(2) With comparison limited to one direction and calculations of a weighting coefficient with combined directivity when there is more than one selected candidate, it is possible to reduce operations such as calculations of a weighting coefficient, array reception operation, level detection and comparison.

(Embodiment 6)

Figure 10:
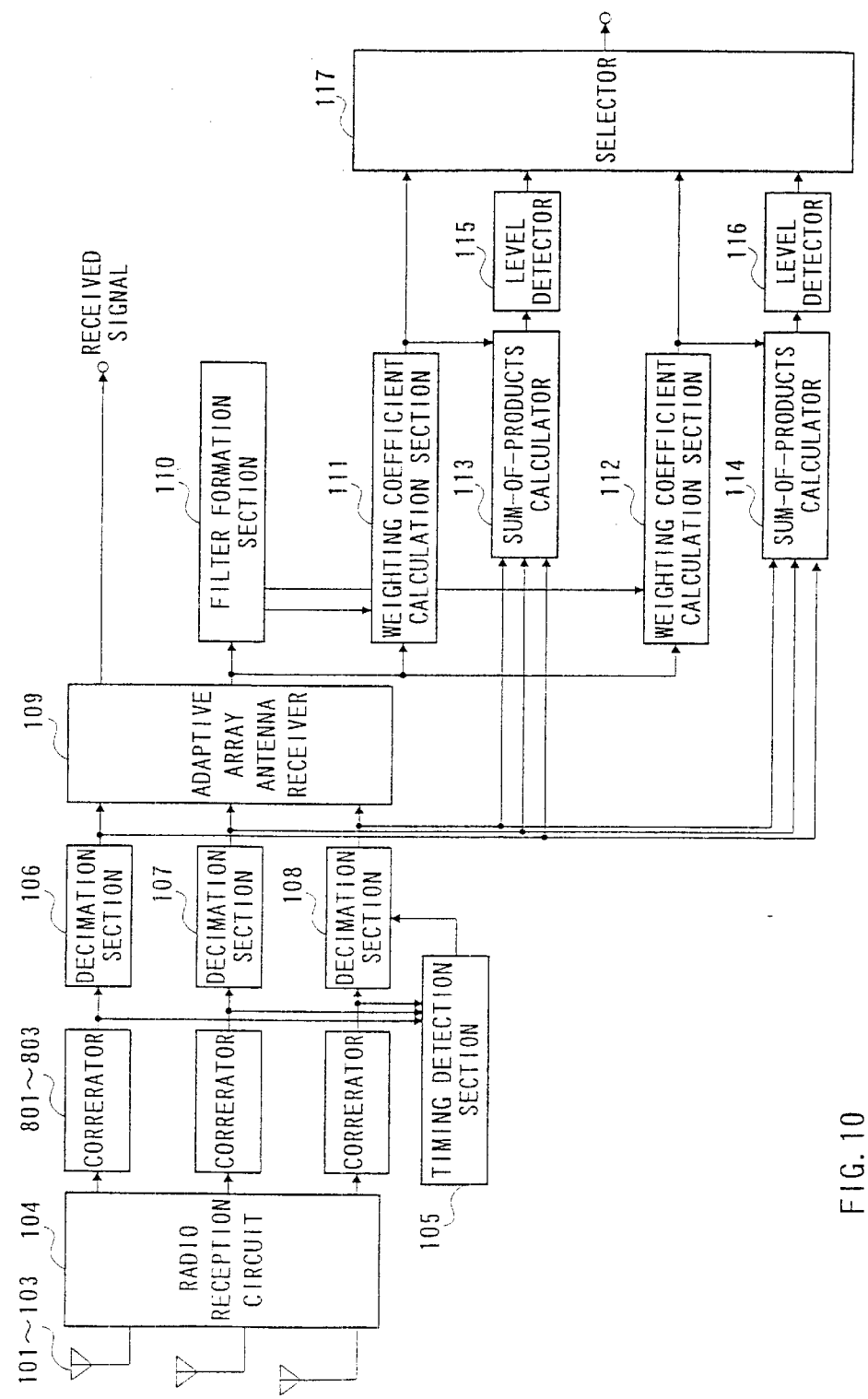
FIG. 10 is a block diagram showing a base station apparatus according to Embodiments 6 to 8 of the present invention.

FIG. 10 is a block diagram showing a base station apparatus according to Embodiment 6 of the present invention. Embodiment 6 is explained using FIG. 10. In FIG. 10, the same parts as those in FIG. 3 are numbered identically and their explanations are omitted. By way of example, a case where the number of antennas of the base station apparatus is 3 is explained.

Signals received through antennas 101 to 103 are amplified, frequency-converted and then A/D-converted by radio reception circuit 104 and baseband signals or IF signals are extracted. These signals are despread using the same spreading codes as those used for spreading according to a spread spectrum communication system by correlators (or matched filters) 801 to 803. The despread signals are sent to timing detection section 105. The processing from timing detection section 105 onward is the same as that in Embodiment 1 and is therefore omitted.

Thus, in the communication apparatus based on the spread spectrum system, a weighting coefficient with a new directivity pattern is calculated from the weighting coefficients of the received signals combined in the adaptive array antenna and the one corresponding to the maximum reception power of the desired wave is selected as the weighting coefficient for transmission, which gives the following effect:

(1) Transmission focused on the direction corresponding to the maximum reception power of the desired wave makes it possible to improve the reception power of the desired wave of the communication counterpart (terminal).

(Embodiment 7)

The configuration of a base station apparatus according to Embodiment 7 of the present invention is virtually the same as that shown in FIG. 10. Therefore, Embodiment 7 is explained using FIG. 10. In FIG. 10, the operations of up to sum-of-products calculators 113 and 114 which obtain sum-of-products of the received signals and weighting coefficients above are the same as those in Embodiment 6. Level detection sections 115 and 116 measure the reception SIR of the received signals combined by the array antenna and selector 117 selects the weighting coefficient with the greater reception SIR detected.

Here, two new weighting coefficients are calculated, compared and selected. It goes without saying, however, that this number can be determined according to the number of array antennas, transmission environment and hardware scale. The method of calculating the reception power of the desired wave and reception SIR is the same as that in Embodiment 2, and thus their explanation is omitted.

As shown above, in the communication apparatus based on the spread spectrum system, a weighting coefficient with a new directivity pattern is calculated from the weighting coefficients of the received signals combined by the adaptive array antenna and the one with the maximum reception SIR is selected as the weighting coefficient for transmission, which gives the following effects:

(1) Transmission focused on the direction with an optimal SIR makes it possible to reduce interference with other stations, improving the communication quality.

(2) The ability to reduce interference with other stations also contributes to increasing the system capacity of the CDMA system.

(Embodiment 8)

The radio communication method or base station apparatus according to Embodiment 6 or Embodiment 7 carries out transmission with directivity corresponding to the maximum reception power of the desired wave or maximum reception SIR. However, if selected with the power of the desired wave, although the reception power of the desired wave of the communication counterpart (terminal) may be improved, the reception SIR may deteriorate and strong interference with other stations may result.

On the other hand, if selected with the reception SIR, although the reception SIR of the communication counterpart (terminal) may be improved and interference with other stations may be reduced, the reception power of the desired wave may be reduced on the contrary, which may deteriorate the line quality in terms of SNR (Signal to Noise Ratio). Therefore, Embodiment 8 is intended to improve the SIR of the communication counterpart (terminal), reduce interference with other stations and at the same time improve the reception power of the desired wave by carrying out transmission after selecting directivity from the results of both the reception power of the desired wave and reception SIR.

The configuration of the base station apparatus according to Embodiment 8 of the present invention is the same as that in FIG. 10. Therefore, Embodiment 8 is explained using FIG. 10. In FIG. 10, the processing of up to sum-of-products calculators 113 and 114 which obtain sum-of-products of the received signals and weighting coefficients above is the same as that in Embodiment 7.

Level detection sections 115 and 116 measure the reception power of the desired wave and reception SIR of the received signals combined by the array antenna and selector 117 selects a weighting coefficient from the results of the reception power of the desired wave and reception SIR.

Here, two new weighting coefficients are calculated, compared and selected. It goes without saying, however, that this number can be determined according to the number of array antennas, transmission environment and hardware scale.

As shown above, in the communication apparatus based on the spread spectrum system, a weighting coefficient with a new directivity pattern is calculated from the weighting coefficients of the received signals combined by the adaptive array antenna and is selected from the results of the reception power of the desired wave and reception SIR as the weighting coefficient for no transmission, which gives the following effects:

(1) If there is no significant difference in the reception power of the desired wave, transmission focused on the direction with an optimal SIR makes it possible to reduce interference with other stations, improving the utilization efficiency of radio spectrum. In the CDMA system, it can also increase the system capacity.

(2) If there is a significant difference in the reception power of the desired wave, transmission focused on the. direction corresponding to the maximum reception power of the desired wave makes it possible to improve the reception power of the desired wave of the communication counterpart (terminal).

(Embodiment 9)

The radio communication method or base station apparatus according to Embodiment 8 carries out transmission by selecting optimal directivity from the reception power of the desired wave and reception SIR. However, a problem occurs when there is a significant difference between the comparison result of the power of the desired wave and the comparison result of the reception SIR. That is, if selected with the power of the desired wave, although the reception power of the desired wave of the communication counterpart (terminal) may be improved, the reception SIR may greatly deteriorate and strong interference with other stations may result.

On the other hand, if selected with the reception SIR, although the reception SIR of the communication counterpart (terminal) may be improved and interference with other stations may be reduced, the reception power of the desired wave may be greatly reduced, which may deteriorate the line quality.

Therefore, Embodiment 9 is intended to improve the SIR of the communication counterpart (terminal), reduce interference with other stations and at the same time improve the reception power of the desired wave by adding a directivity pattern with the same reception directivity as a candidate weighting coefficient to be selected and carrying out transmission after selecting appropriate directivity from the results of both the reception power of the desired wave and reception SIR according to variations in the transmission environment.

Figure 11:
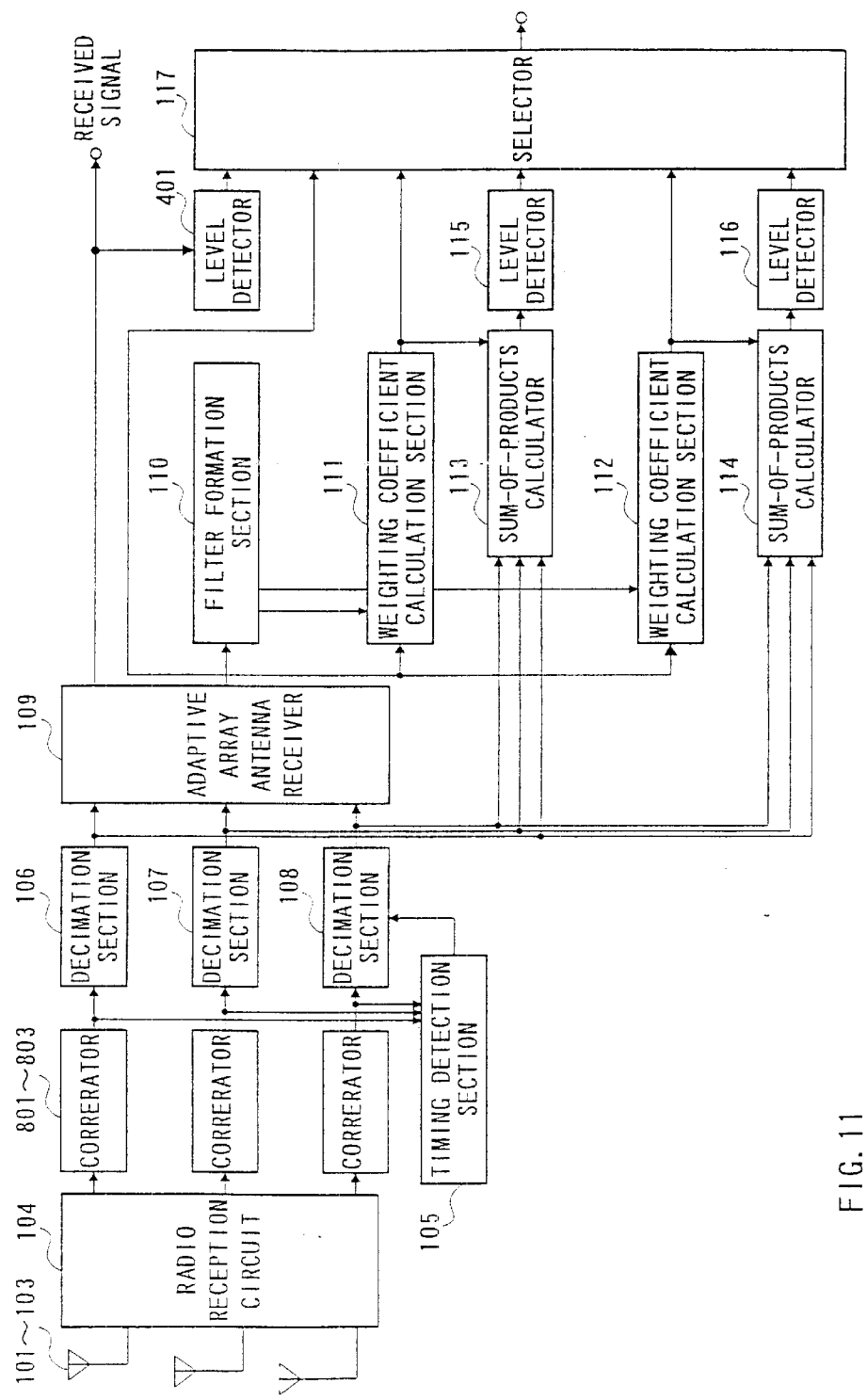
FIG. 11 is a block diagram showing a base station apparatus according to Embodiment 9 of the present invention.

FIG. 11 is a block diagram showing a base station apparatus according to Embodiment 9 of the present invention. In FIG. 11, the same parts as those in FIG. 10 are numbered identically and their explanations are omitted. Embodiment 9 is explained using FIG. 11. By way of example, a case where the number of antennas is 3 is explained.

The processing of up to weighting operation sections 111 and 112 is the same as that in Embodiment 6.

In FIG. 11, sum-of-products calculators 113 and 114 obtain sum-of-products of the received signals and weighting coefficients. This means that array reception of the received signal is performed with two new directivity patterns. Level detection sections 115 and 116 measure the reception power of the desired signal of the received signals combined by the array antenna and reception SIR.

On the other hand, level detection section 401 measures the reception power of the desired signal of the received signals combined by the array antenna and reception SIR. Selector 117 selects a weighting coefficient from the results of the reception power of the desired signal and reception SIR.

Here, two new weighting coefficients are calculated, compared and selected. It goes without saying, however, that this number can be determined according to the number of array antennas, transmission environment and hardware scale.

Thus, in the communication apparatus based on the spread spectrum system, a weighting coefficient with a new directivity pattern is calculated from the weighting coefficients of the received signals combined by the adaptive array antenna and is selected from the results of the reception power of the desired wave and reception SIR as the weighting coefficient for transmission, which gives the following effect:

(1) If there is no significant difference in the reception power of the desired wave, transmission focused on an optimal SIR allows reduction of interference with other stations and effective utilization of radio spectrum.

(2) If there is a significant difference in the reception power of the desired wave but there is no significant difference in the SIR, transmission focused on the direction corresponding to the maximum reception power of the desired wave allows improvements of the reception power of the desired wave of the communication counterpart (terminal).

(3) If there is a significant difference in both the reception power of the desired wave and SIR, and if the large/small tendency is consistent between the reception power of the desired wave and SIR, transmission is carried out focused on the direction corresponding to the maximum reception power of the desired wave and if it is not consistent, transmission is carried out with the same directivity pattern as the reception directivity, which will prevent either the reception power of the desired wave or SIR from extremely deteriorating.

(Embodiment 10)

Figure 12:
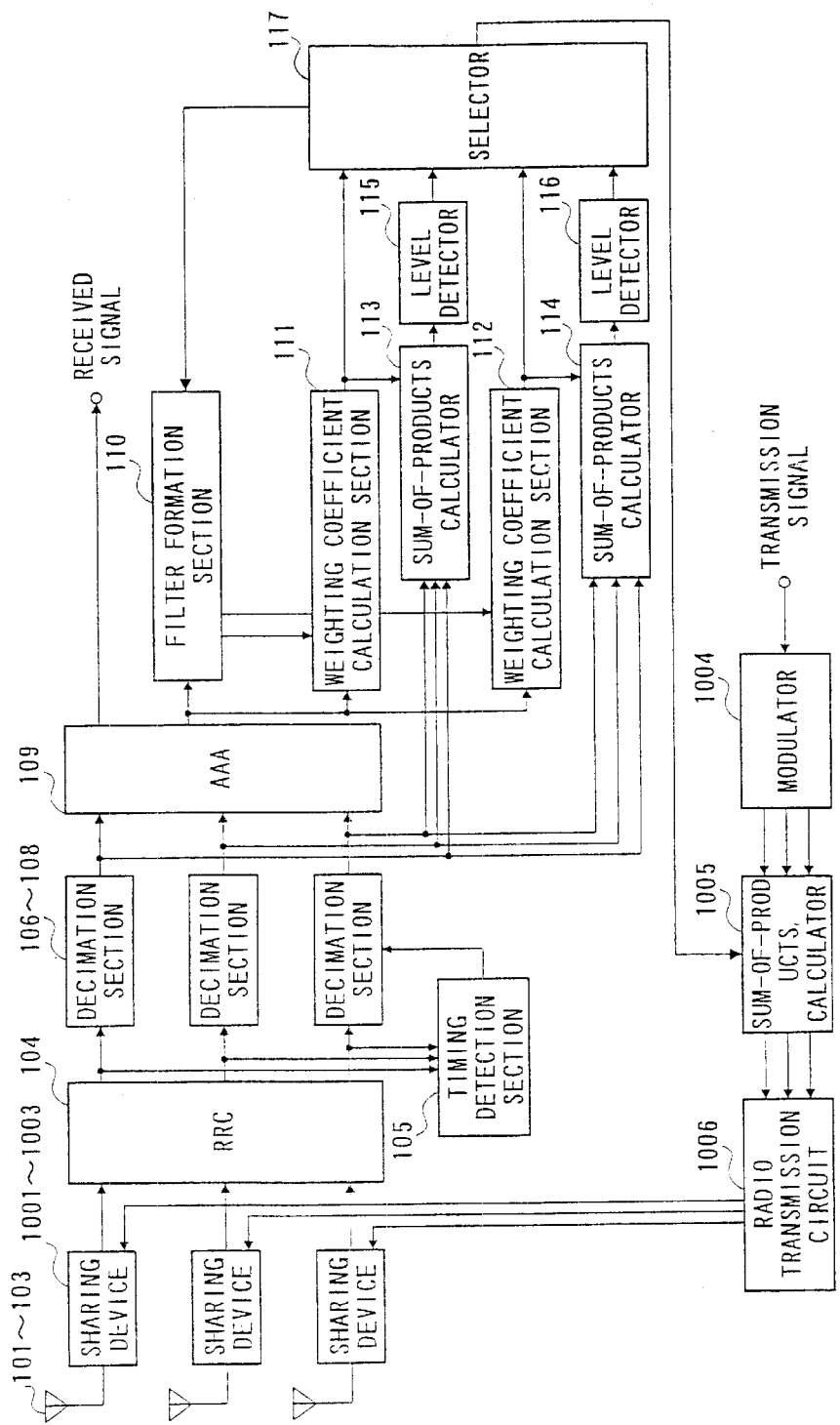
FIG. 12 is a block diagram showing a base station apparatus according to Embodiments 10 and 15 of the present invention.
Figure 14:
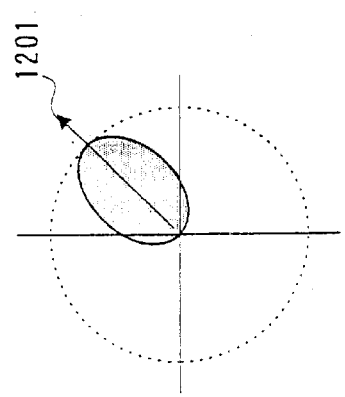
FIG. 14 is a drawing showing transmission directivity of the adaptive array antenna of the base station apparatus according to Embodiment 10 of the present invention.
Figure 13:
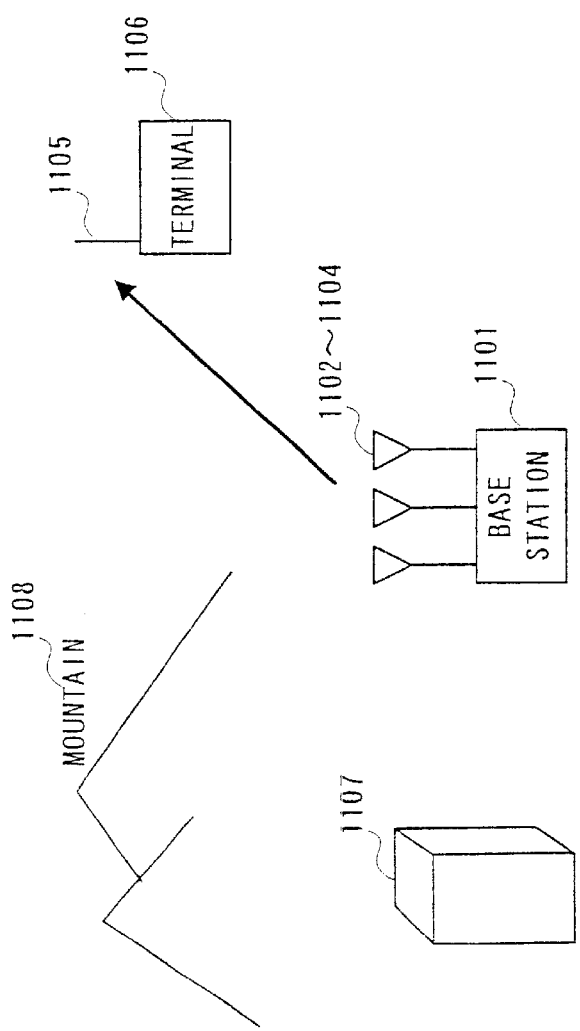
FIG. 13 is a schematic drawing showing a radio transmission model according to Embodiment 10 of the present invention.

FIG. 12 is a block diagram showing a base station apparatus according to Embodiment 10 of the present invention. FIG. 13 shows an example of transmission model during transmission. FIG. 14 shows an example of transmission directivity during transmission. Embodiment 10 is explained using FIG. 12.

First, the receiving side is explained. By way of example, a case where the number of antennas of the base station apparatus is 3 is explained. Signals received through antennas 101 to 103 pass through antenna sharing devices 1001 to 1003 and are amplified, frequency-converted and then A/D-converted by radio reception circuit 104 and baseband signals or IF signals are extracted. These signals are sent to timing detection section 105. The timing detection section calculates optimal reception timing. The method for calculating the optimal reception timing is the same as that in Embodiment 1. The processing of up to weighting coefficient operation sections 111 and 112 is the same as that in Embodiment 1.

In FIG. 12, sum-of-products calculators 113 and 114 obtain sum-of-products of the received signals and weighting coefficients. This means that array reception of the received signal is performed with two new directivity patterns. Level detection sections 115 and 116 measure the reception power of the desired signal of the received signals combined by the array antenna and reception SIR. Selector 117 selects a weighting coefficient from the results of the reception power of the desired signal and reception SIR.

Suppose that the reception power of the desired wave and reception SIR calculated by level detection section 115 are S1 and SIR1, respectively, and the reception power of the desired wave and reception SIR calculated by level detection section 116 are S2 and SIR2, respectively. Also suppose that the weighting coefficients are W1 and W2 and the weighting coefficient to be selected is Wout. One possible example of selection is shown below, where Sthreshold is a threshold for the reception power.

--- if |S1-S2| ≦ S threshold and S I R1 > S I R2 then out = W1
if |S1-S2| ≦ S threshold and S I R1 ≦ S I R2 then out = W2
if |S1-S2| > S threshold and S1 > S2      then out = W1
if |S1-S2| > S threshold and S1 < S2      then out = W2

---

In the example above, the weighting coefficient is selected from the results of the reception power of the desired wave and reception SIR, but it is obvious as in the case of Embodiments 1 and 2 that the weighting coefficient can be selected from the results of the reception power of the desired wave or reception SIR. Here, two new weighting coefficients are calculated, compared and selected. It goes without saying, however, that this number can be determined according to the number of array antennas, transmission environment and hardware scale. Moreover, the example of the method of calculating the reception power of the desired wave and reception SIR is the same as that in the embodiment above.

Then, the transmitting side is explained. A transmission signal is modulated by modulator 1004. Sum-of-products calculator 1005 multiplies the signal by the weighting coefficient selected by selector 117. The multiplication result is frequency-converted and amplified by radio transmission circuit 1006, passed through antenna sharing devices 1001 to 1003 and transmitted from antennas 101 to 103.

FIG. 13 shows an example of transmission model during transmission. FIG. 14 shows an example of transmission directivity at that time. A signal controlled with a selected weighting coefficient in base station 1101 is transmitted with directivity in the direction shown by arrow 1201, irrespective of building 1107 and mountain 1108 and received by antenna 1105 of terminal 1106.

Thus, a weighting coefficient with a new directivity pattern is calculated from the weighting coefficients of the received signals combined by the adaptive array antenna and is selected from the results of the reception power of the desired wave and the reception power SIR as the weighting coefficient for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave, transmission focused on the direction corresponding to the maximum reception power of the desired wave allows improvements of the reception power of the desired wave of the communication counterpart (terminal).

(Embodiment 11)

Figure 15:
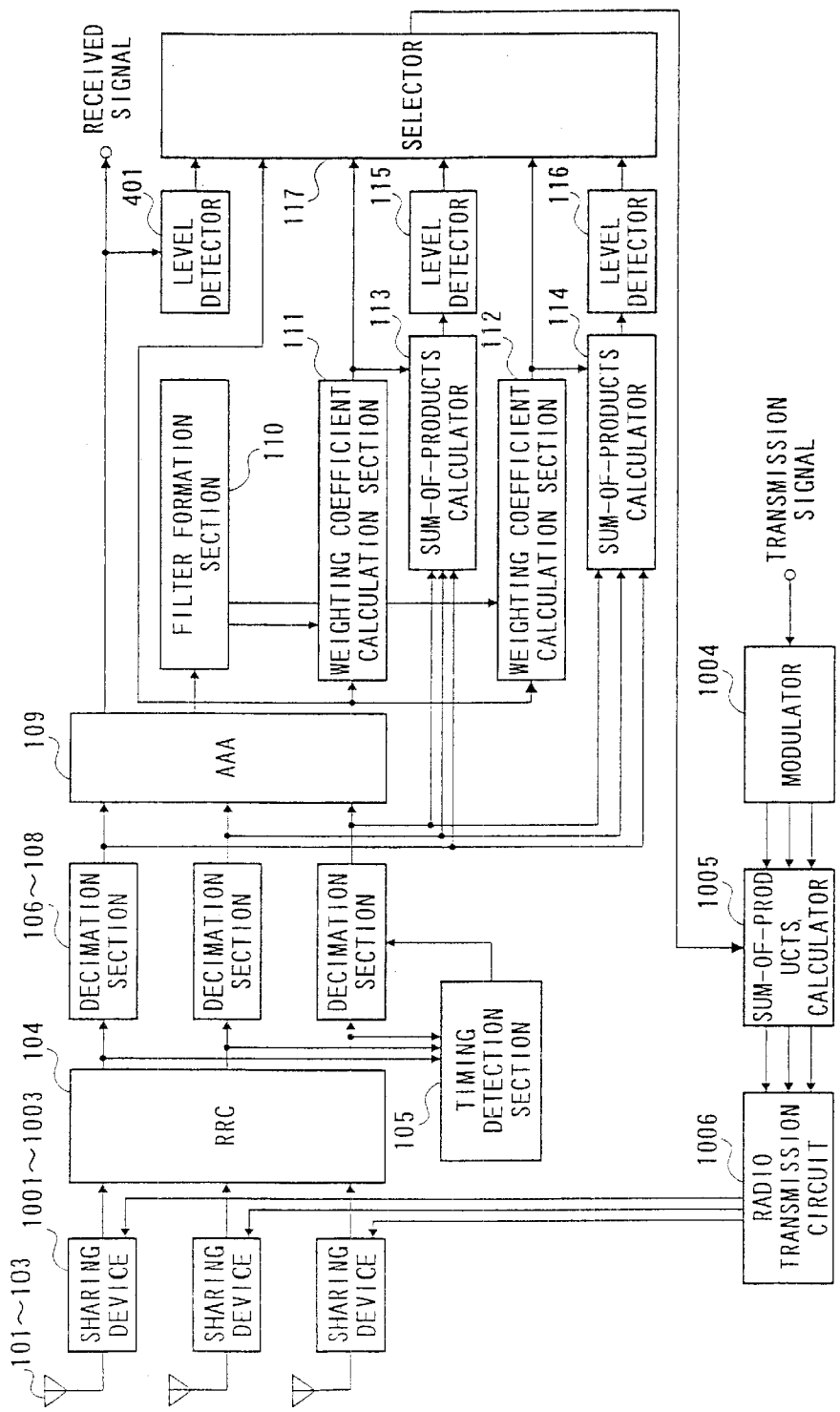
FIG. 15 is a block diagram showing a base station apparatus according to Embodiments 11 and 16 of the present invention.

FIG. 15 is a block diagram showing a base station apparatus according to Embodiment 11 of the present invention. Embodiment 11 is explained using FIG. 15. The same parts as in those FIG. 12 are numbered identically and their explanations are omitted.

First, the receiving side is explained. The processing of up to sum-of-products 113 and 114 is the same as that in Embodiment 10. In FIG. 15, sum-of-products calculators 113 and 114 obtain sum-of-products of the received signals and weighting coefficients. This means that array reception of the received signal is performed with two new directivity patterns. Level detection sections 115 and 116 measure the reception power of the desired signal of the received signals combined by the array antenna and reception SIR. On the other hand, level detection section 401 measures the reception power of the desired signal of the received signals combined by the array antenna and reception SIR.

Selector 117 selects a weighting coefficient from the results of the reception power of the desired signal and reception SIR. Suppose that the reception power of the desired wave and reception SIR calculated by level detection section 401 are S0 and SIR0, respectively, and the reception power of the desired wave and reception SIR calculated by level detection section 115 are S1 and SIR1, and the reception power of the desired wave and reception SIR calculated by level detection section 116 are S2 and SIR2. Also suppose that the weighting coefficients are W0 to W2 and the weighting coefficient to be selected is Wout. One possible example of selection is shown below. Here, Sthreshold is a threshold for the reception power and SIR threshold is a threshold for SIR.

if |S1–S2|≦S threshold and SIR 1>SIR 2 then out=W1
if |S1–S2|≦S threshold and SIR 1≦SIR 2 then out=W2
if |S1–S2|>S threshold and |SIR 1–SIR 2|≦SIR threshold
{

| | |
|---|---|
| if S1 > S2 | then Wout = W1 |
| if S1 < S2 | then Wout = W2 |

}
if |S1–S2|>S threshold and |SIR 1–SIR 2|>SIR threshold
{

| | |
|---|---|
| if S1 > S2 and S I R1 > S I R2 | then Wout = W1 |
| if S1 < S2 and S I R1 < S I R2 | then Wout = W2 |
| if S1 > S2 and S I R1 < S I R2 | then Wout = W0 |
| if S1 < S2 and S I R1 > S I R2 | then Wout = W0 |

}

Here, two new weighting coefficients are calculated, compared and selected. It goes without saying, however, that this number can be determined according to the number of array antennas, transmission environment and hardware scale.

Then, the transmitting side is explained. A transmission signal is modulated by modulator 1004. Sum-of-products calculator 1005 multiplies the signal by the weighting coefficient selected by selector 117. The multiplication result is frequency-converted and amplified by radio transmission circuit 1006, passed through antenna sharing devices 1001 to 1003 and transmitted from antennas 101 to 103.

Thus, a weighting coefficient with a new directivity pattern is calculated from the weighting coefficients of the received signals combined by the adaptive array antenna and is selected from the results of the reception power of the desired wave and the reception power SIR as the weighting coefficient for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave but there is no significant difference in the SIR, transmission focused on the direction corresponding to the maximum reception power of the desired wave allows improvements of the reception power of the desired wave of the communication counterpart (terminal).

(3) If there is a significant difference in both the reception power of the desired wave and SIR, and if the large/small tendency is consistent between the reception power of the desired wave and SIR, transmission is carried out focused on the direction corresponding to the maximum reception power of the desired wave and if it is not consistent, transmission is carried out with the same directivity pattern as the reception directivity, which will prevent either the reception power of the desired wave or SIR from extremely deteriorating.

(Embodiment 12)

Figure 16:
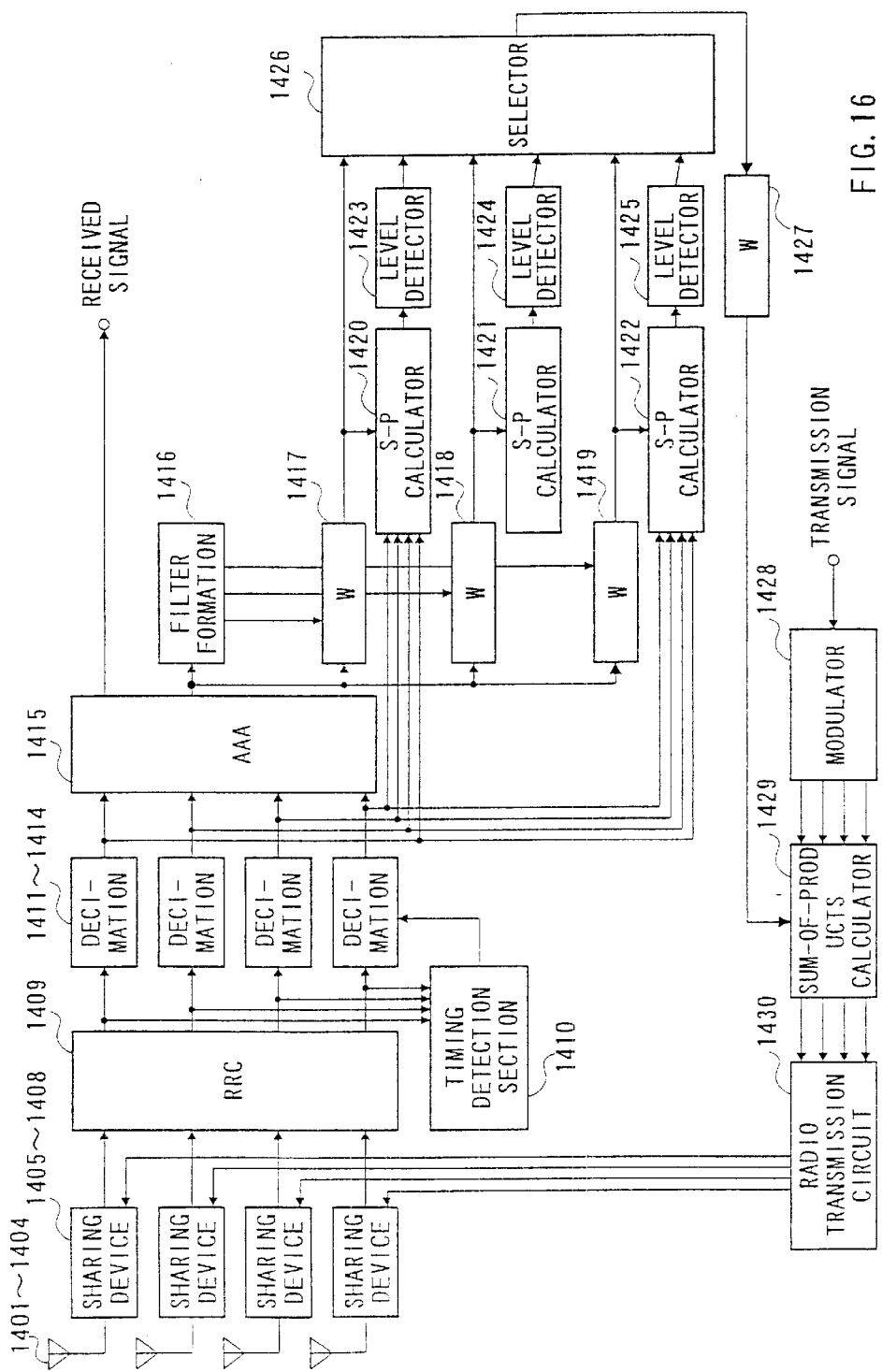
FIG. 16 is a block diagram showing a base station apparatus according to Embodiments 12 and 17 of the present invention.

FIG. 16 is a block diagram showing a base station apparatus according to Embodiment 12 of the present invention. Embodiment 12 is explained using FIG. 16.

First, the receiving side is explained. By way of example, a case where the number of antennas of the base station apparatus is 4 is explained. Signals are received through antennas 1401 to 1404, passed through antenna sharing devices 1405 to 1408, amplified, frequency-converted and then A/D-converted by radio reception circuit 1409 and baseband signals or IF signals are extracted. These signals are sent to timing detection section 1410. The timing detection section calculates optimal reception timing. The method of calculating the optimal reception timing is the same as that in the embodiment above.

Timing t0 is sent to decimation sections 1411 to 1414. In the decimation sections the received signals with timing t0 are sent to adaptive array antenna receiver 1415. The adaptive array antenna receiver combines the received signals of the four antennas in such a way that the desired wave or SIR can reach a maximum value. Furthermore, adaptive array antenna receiver 1415 outputs the combination result and weighting coefficients. This weighting coefficient forms reception directivity. An example of reception directivity is 601 in FIG. 8A.

Filter formation section 1416 estimates the incoming direction of a desired wave from the reception weighting coefficient and calculates and outputs a coefficient which has directivity in a specific direction. The directivity formation technique is the same as that in the embodiment above.

Weighting coefficient operation sections 1417 to 1419 calculate new weighting coefficients by multiplying the directivity obtained from the weighting coefficients of the adaptive array antenna receiver and filter coefficients. FIG. 8A shows that new weighting coefficients with 3 directivity patterns are obtained by multiplying reception directivity pattern 601 through adaptive array reception by directivity filter coefficients 602 to 604.

The above example shows a case where a weighting coefficient with a new directivity pattern is calculated by multiplying a reception directivity pattern by a directivity filter coefficient. However, there are also other examples of the directivity formation technology such as the method described in "Adaptive zone configuration using a circular 8-element array antenna" by Kanazawa and Iwama, et al. (TECHNICAL REPORT OF IEICE RCS-96-148, 1997-02).

That is, one is an analytical technique using Fourier series expansion and the other is a technique for obtaining an optimal solution using a least-square estimation algorithm. When such a directivity formation algorithm is used, filter formation section 1416 estimates the direction of each lobe and null point from the reception weighting coefficient and calculates and outputs a coefficient necessary to create directivity (lobe) in a specific direction. Weighting coefficient operation sections 1417 to 1419 calculate new weighting coefficients by the directivity formation algorithm using the directivity obtained from the weighting coefficients through the adaptive array antenna receiver and the above coefficients.

In FIG. 16, sum-of-products calculators 1420 to 1422 obtain sum-of-products of the received signals and weighting coefficients above. This means that array reception of the received signal is performed with three new directivity patterns. Level detection sections 1423 to 1425 measure the reception power of the desired signal of the received signals combined by the array antenna and reception SIR.

Selector 1426 selects a weighting coefficient from the results of the reception power of the desired wave and reception SIR. At this time, suppose that two weighting coefficients instead of one coefficient is selected. As for the number of weighting coefficients to be selected, it is possible to set a high limit and select a value within the range from the results of the reception power of the desired wave above and reception SIR. At this time, weighting coefficient operation section 1427 calculates and outputs a weighting coefficient with directivity combining the directivity patterns of the two selected weighting coefficients. For example, as shown in FIG. 8B, directivity patterns 605 and 606 of the two selected directions of the three directivity patterns shown in FIG. 8A are combined into directivity pattern 607 and a weighting coefficient having this directivity pattern 607 is calculated.

The implementation shown in FIG. 16 is further provided with weighting coefficient operation section 1427 as a section for calculating directivity patterns of the two selected weighting coefficients and weighting coefficients having the directivity combining those directivity patterns. However, through the same section as that in Embodiment 5, the above calculations can also be performed without providing additional configuration section.

Here, three new weighting coefficients are calculated, compared and selected. It goes without saying, however, that this number can be determined according to the number of array antennas, transmission environment and hardware scale. The level detection circuit measures the reception power of the desired wave age and reception SIR, but it is obvious that it is possible to measure either one and select the weighting coefficient based on the measurement result.

Then, the transmitting side is explained. A transmission signal is modulated by modulator 1428. Sum-of-products calculator 1429 multiplies the signal by the weighting coefficient calculated by weighting coefficient calculator 1427. The multiplication result is frequency-converted and amplified by radio transmission circuit 1430, passed through antenna sharing devices 1405 to 1408 and transmitted from antennas 1401 to 1404.

Thus, a weighting coefficient with a new directivity pattern is calculated from the weighting coefficients of the received signals combined by the adaptive array antenna and a plurality of weighting coefficients, instead of only one weighting coefficient, can be selected from the results of the reception power of the desired wave and the reception power SIR as the weighting coefficient for transmission, and if a plurality of weighting coefficients are selected, transmission is carried out by making it possible to calculate weighting coefficients with directivity combining their respective directivity patterns, which gives the following effects:

(1) Allows transmission with optimal directivity from the reception power of the power of the desired wave and reception SIR.

(2) Comparison is limited to one direction and if there is more than one candidate selected, weighting coefficients with combined directivity are calculated, which makes it possible to reduce operations such as calculation of weighting coefficients, array reception operations, level detection and comparison, etc.

(Embodiment 13)

Figure 17:
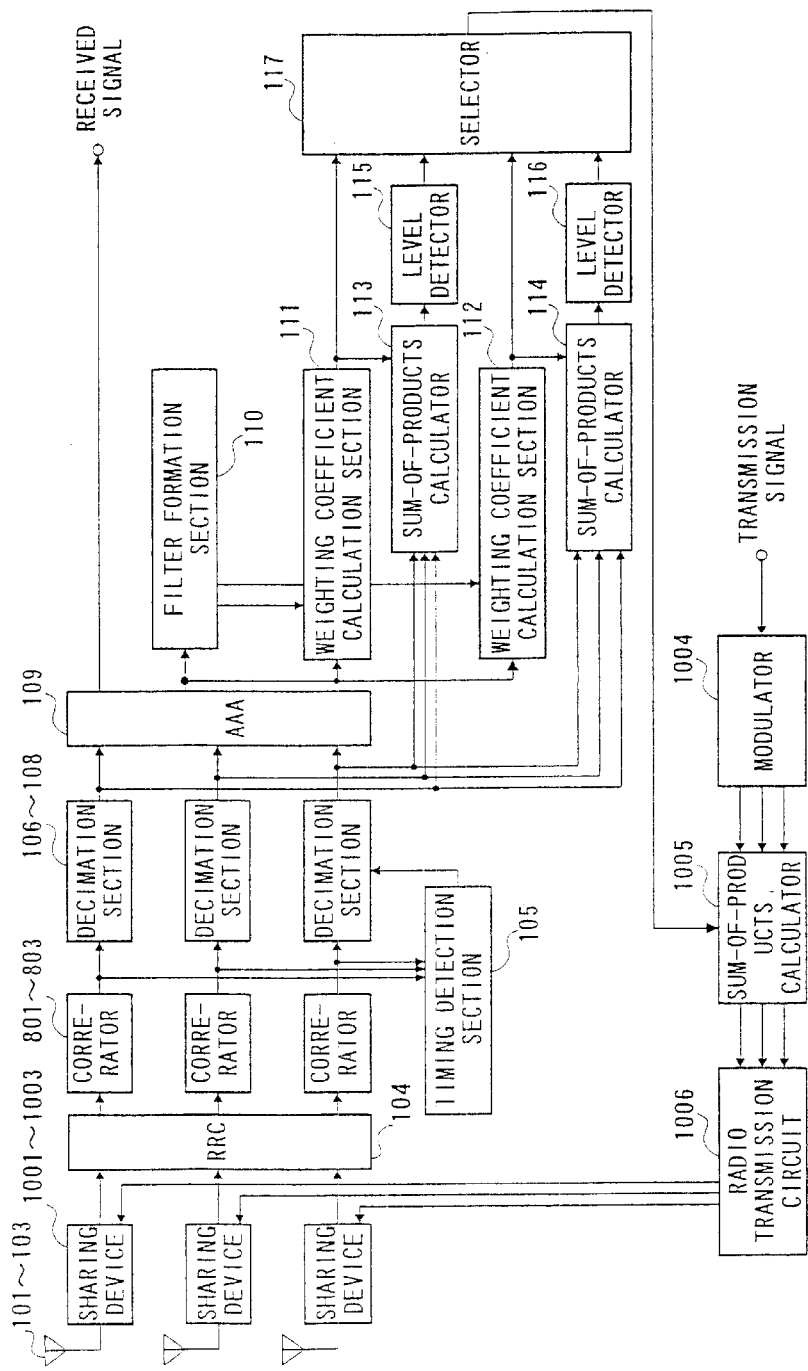
FIG. 17 is a block diagram showing a base station apparatus according to Embodiments 13 and 18 of the present invention.

FIG. 17 is a block diagram showing a base station apparatus according to Embodiment 13 of the present invention. Embodiment 13 is explained using FIG. 17.

On the receiving side, the operation is the same as that in Embodiment 10 except that it includes despreading processing of a received signal. In the above example, a weighing coefficient is selected from the results of the reception power of the desired wave and reception SIR, but it is obvious that the weighting coefficient can be selected from the results of the reception power of the desired wave and reception SIR as in the case of Embodiments 6 and 7.

Then, the transmitting side is explained. A transmission signal is modulated by modulator 1004. At this time, not only data modulation but also spreading modulation is carried out. Sum-of-products calculator 1005 multiplies the signal by the weighting coefficient selected by selector 117. Then, the transmitting side is explained. A transmission signal is modulated by modulator 1004. Sum-of-products calculator 1005 multiplies the signal by the weighting coefficient selected by selector 117. The multiplication result is frequency-converted and amplified by radio transmission circuit 1006, passed through antenna sharing devices 1001 to 1003 and transmitted from antennas 101 to 103.

Thus, in the communication apparatus based on the spread spectrum system, a weighting coefficient with a new directivity pattern is calculated from the weighting coefficients of the received signals combined by the adaptive array antenna and is selected from the results of the reception power of the desired wave and the reception SIR as the weighting coefficient for transmission, which gives the following effects:

(1) If there is no significant difference in the reception power of the desired wave, transmission focused on the direction with an optimal SIR makes it possible to reduce interference with other stations, improving the utilization efficiency of radio spectrum. In the CDMA system, it can also increase the system capacity.

(2) If there is a significant difference in the reception power of the desired wave, transmission focused on the direction corresponding to the maximum reception power of the desired wave allows improvements of the reception power of the desired wave of the communication counterpart (terminal).

(Embodiment 14)

Figure 18:
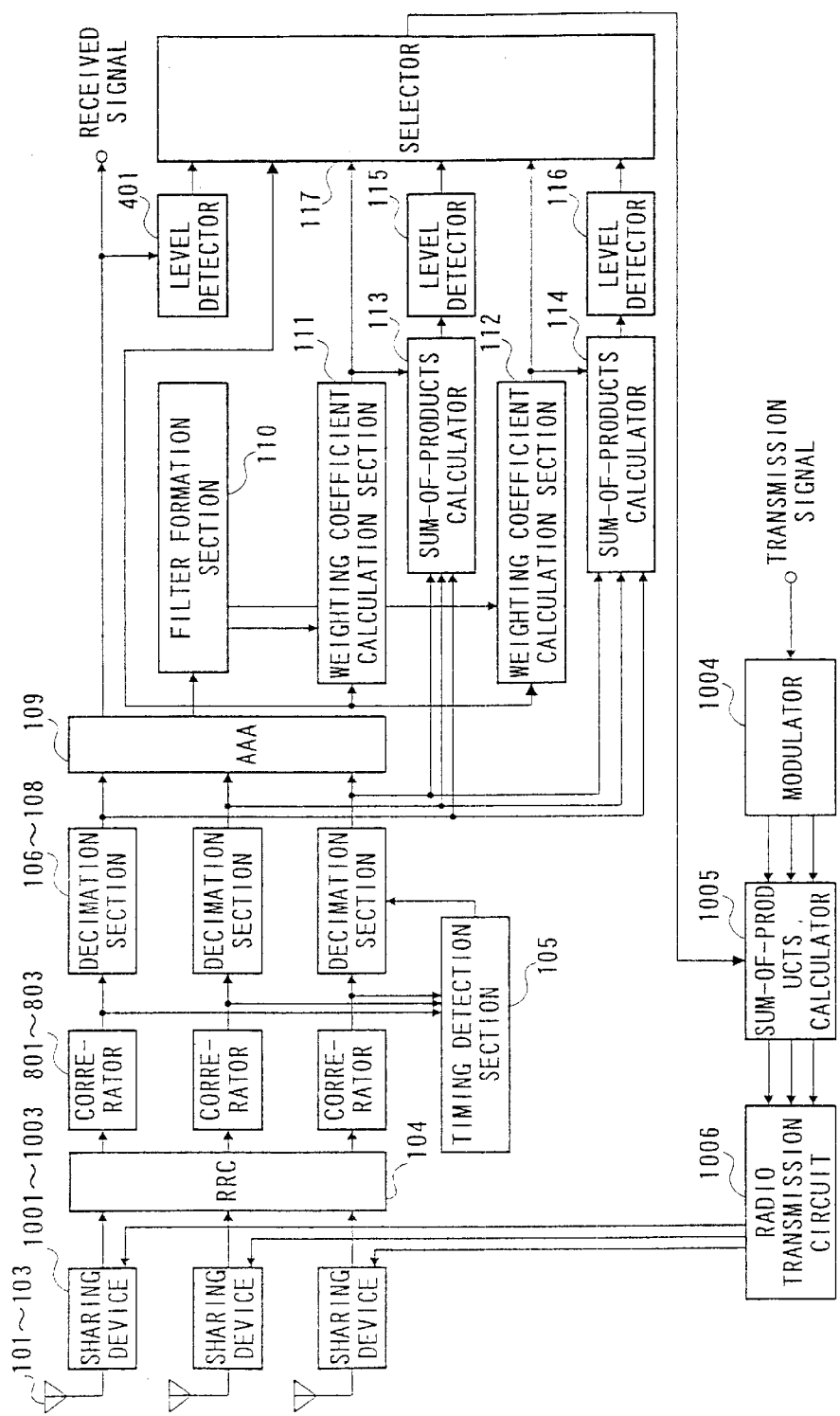
FIG. 18 is a block diagram showing a base station apparatus according to Embodiments 14 and 19 of the present invention.

FIG. 18 is a block diagram showing a base station apparatus according to Embodiment 14 of the present invention. Embodiment 14 is explained using FIG. 18. On the receiving side, the operation is the same as that in Embodiment 11 except that it includes despreading processing of a received signal.

On the transmitting side, a transmission signal is modulated by modulator 1004. At this time, not only data modulation but also spreading modulation is carried out. Sum-of-products calculator 1005 multiplies the signal by the weighting coefficient selected by selector 117. The multiplication result is frequency-converted and amplified by radio transmission circuit 1006, passed through antenna sharing devices 1001 to 1003 and transmitted from antennas 101 to 103.

Thus, in the communication apparatus based on the spread spectrum system, a weighting coefficient with a new directivity pattern is calculated from the weighting coefficients of the received signals combined by the adaptive array antenna and is selected from the results of the reception power of the desired wave and the reception power SIR as the weighting coefficient for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave but there is no significant difference in the SIR, transmission focused on the direction corresponding to the maximum reception power of the desired wave allows improvements of the reception power of the desired wave of the communication counterpart (terminal).

(3) If there is a significant difference in both the reception power of the desired wave and SIR, and if the large/small tendency is consistent between the reception power of the desired wave and SIR, transmission is carried out focused on the direction corresponding to the maximum reception power of the desired wave and if it is not consistent, transmission is carried out with the same directivity pattern as the reception directivity, which will prevent either the reception power of the desired wave or SIR from extremely deteriorating.

(Embodiment 15)

Figure 19:
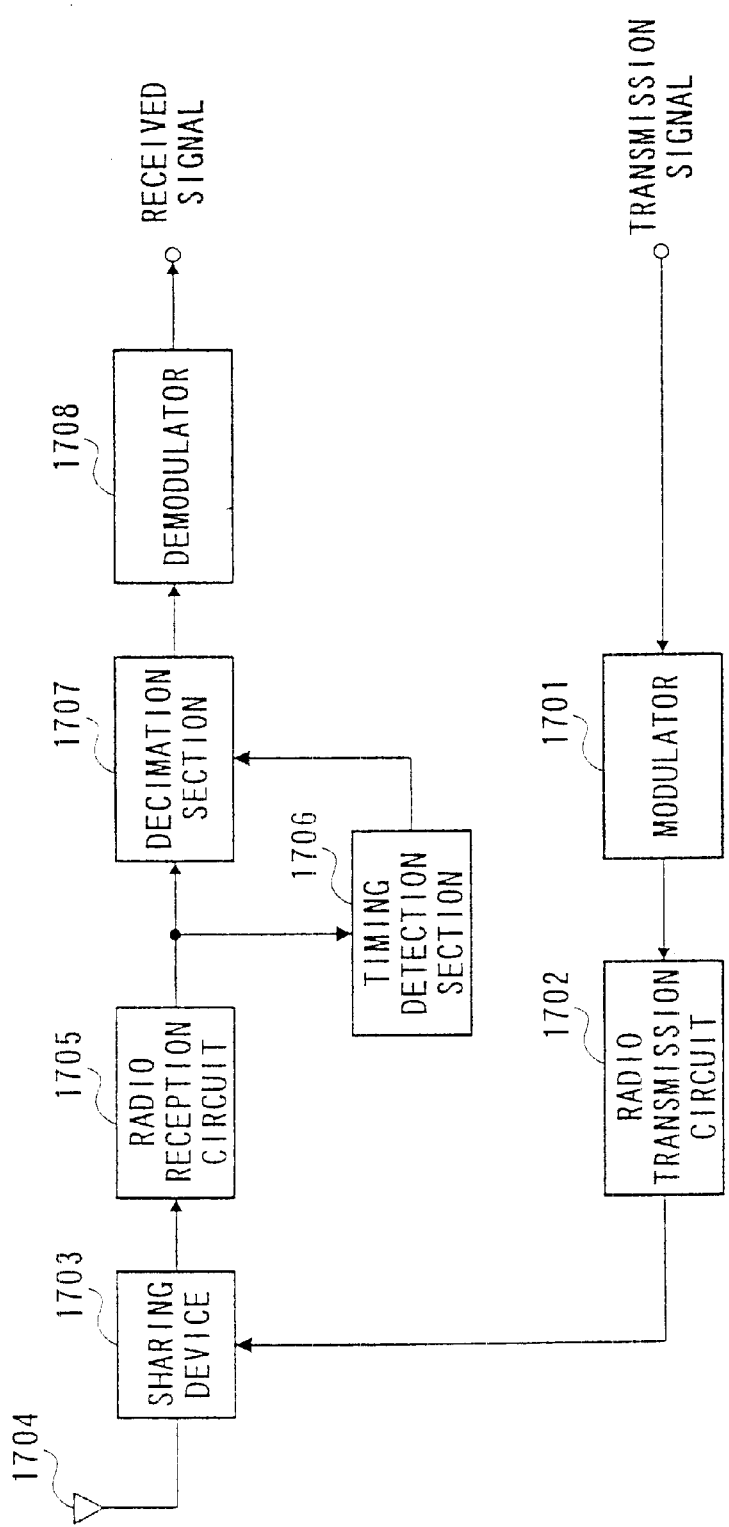
FIG. 19 is a block diagram showing a terminal apparatus according to Embodiments 15 to 17 of the present invention.

Embodiment 15 is explained using FIG. 12 and FIG. 19. This is a communication system made up of a communication apparatus (base station) with the configuration in FIG. 12 and another communication apparatus (terminal) with the configuration in FIG. 19.

First, the uplink is explained. The communication apparatus (terminal) on its transmitting side modulates a transmission signal by modulator 1701. The modulated signal is frequency-converted and amplified by radio transmission circuit 1702, passed through antenna sharing device 1703 and transmitted from antenna 1704.

The reception in the communication apparatus (base station) with the configuration in FIG. 12 is the same as that explained in Embodiment 10. A received signal is obtained through array reception by adaptive array antenna receiver 109. Selector 117 selects a weighting coefficient from the results of the reception power of the desired wave and reception SIR.

Then, the downlink is explained. The communication terminal apparatus (base station) on its transmitting side modulates a transmission signal by modulator 1004. Sum-of-products calculator 1005 multiplies the signal by weighting coefficient selected by selector 117. The multiplication result is frequency-converted and amplified by radio transmission circuit 1006, passed through antenna sharing devices 1001 to 1003 and transmitted from antennas 101 to 103.

On the other hand, on the terminal side, the signal is received through antenna 1704, passed through antenna sharing device 1705, amplified, frequency-converted and A/D-converted by radio reception circuit 1705 and baseband signal or IF signal is extracted. This signal is sent to timing detection section 1706. The timing detection section calculates optimal reception timing. The optimal reception timing is calculated, for example, by embedding a pattern known to both the transmitter and receiver in a frame, transmitting it from the transmitter, carrying out A/D conversion by the receiver for a period several or over ten times a one-symbol time, performing correlation operation with the known symbol and detecting timing t0 at which great power results from the correlation operation. This timing t0 is sent to decimation section 1707. The decimation section sends the received signal of timing t0 to demodulator 1708. The demodulator demodulates and outputs the received signal.

Thus, in the radio communication system, one communication apparatus comprises a transmission/reception section using an adaptive array antenna and calculates a weighting coefficient with a new directivity pattern from the weighting coefficient of the received signal combined by the adaptive array antenna, selects and transmits the weighting coefficient from the results of the reception power of the desired wave and reception SIR for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave but there is no significant difference in the SIR, transmission focused on the direction corresponding to the maximum reception power of the desired wave allows improvements of the reception power of the desired wave of the communication counterpart (terminal).

(Embodiment 16)

Embodiment 16 is explained using FIG. 15 and FIG. 19. This is a communication system made up of a communication apparatus (base station) with the configuration in FIG. 15 and another communication apparatus (terminal) with the configuration in FIG. 19.

First, the uplink is explained. The communication apparatus (terminal) on its transmitting side modulates a transmission signal by modulator 1701. The modulated signal is frequency-converted and amplified by radio transmission circuit 1702, passed through antenna sharing device 1703 and transmitted from antenna 1704.

The reception in the communication apparatus (base station) with the configuration in FIG. 15 is the same as that explained in Embodiment 11. A received signal is obtained through array reception by adaptive array antenna receiver 109. Selector 117 selects a weighting coefficient from the results of the reception power of the desired wave and reception SIR.

Then, the downlink is explained. The communication terminal apparatus (the base station) on its transmitting side modulates a transmission signal by modulator 1004. Sum-of-products calculator 1005 multiplies the signal by weighting coefficient selected by selector 117. The multiplication result is frequency-converted and amplified by radio transmission circuit 1006, passed through antenna sharing devices 1001 to 1003 and transmitted from antennas 101 to 103.

On the other hand, on the terminal side, the signal is received through antenna 1704, passed through antenna sharing device 1703, amplified by radio reception circuit 1705, frequency-converted and A/D-converted by radio reception circuit 1705 and baseband signal or IF signal is extracted. This signal is sent to timing detection section 1706. The timing detection-section calculates optimal reception timing. The optimal reception timing is calculated, for example, by embedding a pattern known to both the transmitter and receiver in a frame, transmitting it from the transmitter, carrying out A/D conversion by the receiver for a period several or over ten times a one-symbol time, performing correlation operation with the known symbol and detecting timing t0 at which great power results from the correlation operation. This timing t0 is sent to decimation section 1707. The decimation section sends the received signal of timing t0 to demodulator 1708. The demodulator demodulates and outputs the received signal.

Thus, in the radio communication system, one communication apparatus comprises a transmission/reception section using an adaptive array antenna and calculates a weighting coefficient with a new directivity pattern from the weighting coefficient of the received signal combined by the adaptive array antenna, selects and transmits the weighting coefficient from the results of the reception power of the desired wave and reception SIR for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave but there is no significant difference in the SIR, transmission focused on the direction corresponding to the maximum reception power of the desired wave allows improvements of the reception power of the desired wave of the communication counterpart (terminal).

(3) If there is a significant difference in both the reception power of the desired wave and SIR, and if the large/small tendency is consistent between the reception power of the desired wave and SIR, transmission is carried out focused on the direction corresponding to the maximum reception power of the desired wave and if it is not consistent, transmission is carried out with the same directivity pattern as the reception directivity, which will prevent either the reception power of the desired wave or SIR from extremely deteriorating.

(Embodiment 17)

Embodiment 17 is explained using FIG. 16 and FIG. 19. This is a communication system made up of a communication apparatus (base station) with the configuration in FIG. 16 and another communication apparatus (terminal) with the configuration in FIG. 19.

First, the uplink is explained. The communication apparatus (terminal) on its transmitting side modulates a transmission signal by modulator 1701. The modulated signal is frequency-converted and amplified by radio transmission circuit 1702, passed through antenna sharing device 1703 and transmitted from antenna 1704.

The reception in the communication apparatus (base station) with the configuration in FIG. 16 is the same as that explained in Embodiment 12. A received signal is obtained through array reception by adaptive array antenna receiver 1415. Selector 1426 selects a weighting coefficient from the results of the reception power of the desired wave and reception SIR. If a plurality of weighting coefficients are selected, weighting coefficient calculator 1427 calculates and outputs a weighting coefficient with directivity combining directivity patterns of a plurality of weighting coefficients selected. It is obvious that calculation of the weighting coefficient with combined directivity can also be executed using a section similar to that in Embodiment 5 without providing an additional configuration section.

Then, the downlink is explained. The communication apparatus of the base station on its transmitting side modulates a transmission signal by modulator 1428. Sum-of-products calculator 1429 multiplies the signal by weighting coefficient calculated by weighting coefficient calculator 1427. The multiplication result is frequency-converted and amplified by radio transmission circuit 1430, passed through antenna sharing devices 1405 to 1408 and transmitted from antennas 1401 to 1404.

On the other hand, on the terminal side, the signal is received through antenna 1704, passed through antenna sharing device 1703, amplified, frequency-converted and A/D-converted by radio reception circuit 1705 and baseband signal or IF signal is extracted. This signal is sent to timing detection section 1706. The timing detection section calculates optimal reception timing. The optimal reception timing is calculated, for example, by embedding a pattern known to both the transmitter and receiver in a frame, transmitting it from the transmitter, carrying out A/D conversion by the receiver for a period several or over ten times a one-symbol time, performing correlation operation with the known symbol and detecting timing t0 at which great power results from the correlation operation. This timing t0 is sent to decimation section 1707. The decimation section sends the received signal of timing t0 to demodulator 1708. The demodulator demodulates and outputs the received signal.

Thus, in the radio communication system, one communication apparatus comprises a transmission/reception section using an adaptive array antenna and calculates a weighting coefficient with a new directivity pattern from the weighting coefficient of the received signal combined by the adaptive array antenna, selects and transmits the weighting coefficient from the results of the reception power of the desired wave and reception SIR for transmission without limiting the number of weighting coefficients to be selected for transmission to only one, but making it possible to select a plurality of weighting coefficients and if a plurality of weighting coefficients are selected transmission is carried out by making it possible to calculate weighting coefficients with directivity combining their respective directivity patterns, which gives the following effects:

(1) Allows transmission with optimal directivity based on the reception power of the power of the desired wave and reception SIR.

(2) Comparison is limited to one direction and if there is more than one candidate selected, weighting coefficients with combined directivity are calculated, which makes it possible to reduce operations such as calculation of weighting coefficients, array reception operations, level detection and comparison, etc.

(Embodiment 18)

Figure 20:
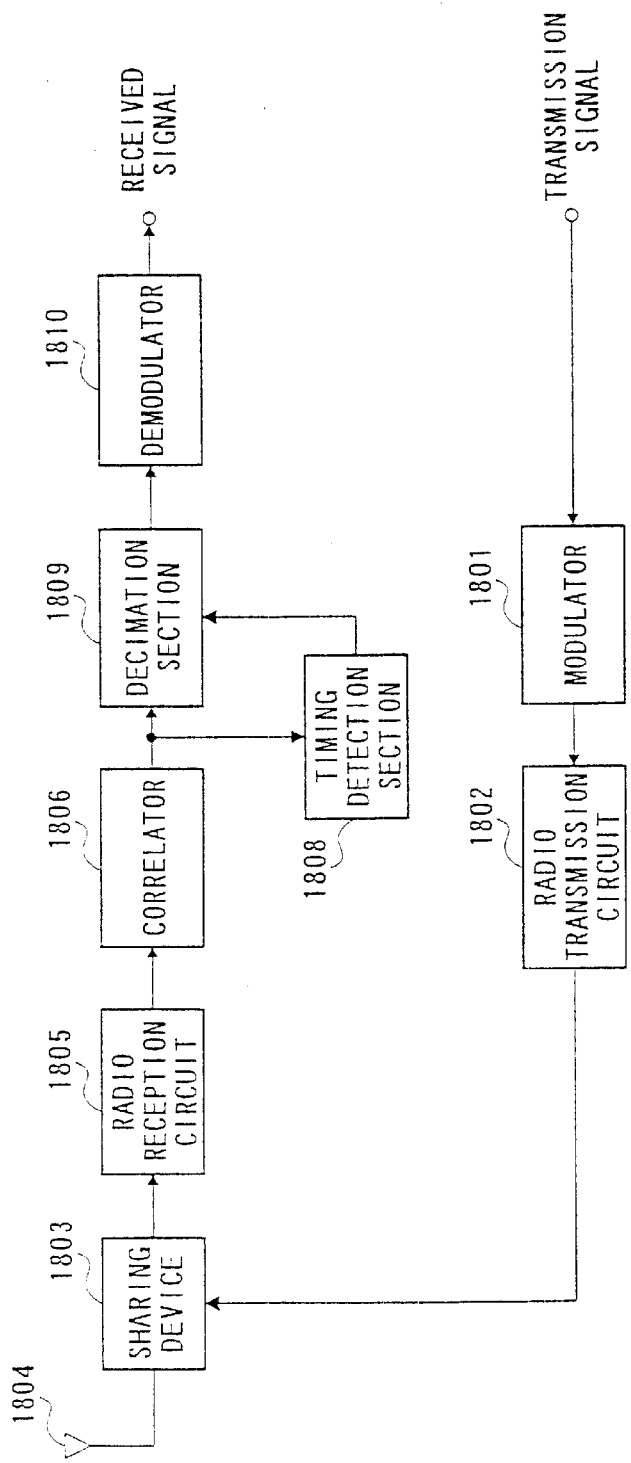
FIG. 20 is a block diagram showing a terminal apparatus according to Embodiments 18 and 19 of the present invention.

Embodiment 18 is explained using FIG. 17 and FIG. 20. This is a communication system based on a spread spectrum system made up of a communication apparatus (base station) with the configuration in FIG. 17 and another communication apparatus (terminal) with the configuration in FIG. 20.

First, the uplink is explained. The communication apparatus (terminal) on its transmitting side modulates a transmission signal by modulator 1801. At this time, not only data modulation but also spreading modulation is carried out. The modulated signal is frequency-converted and amplified by radio transmission circuit 1802, passed through antenna sharing device 1803 and transmitted from antenna 1804.

The reception in the communication apparatus (base station) with the configuration in FIG. 17 is the same as that explained in Embodiment 13. A received signal is obtained through array reception by adaptive array antenna receiver 109. Selector 117 selects a weighting coefficient from the results of the reception power of the desired wave and reception SIR.

Then, the downlink is explained. The communication apparatus (base station) on its transmitting side modulates a transmission signal by modulator 1004. At this time, not only data modulation but also spreading modulation is carried out. Sum-of-products calculator 1005 multiplies the signal by weighting coefficient selected by selector 117. The multiplication result is frequency-converted and amplified by radio transmission circuit 1006, passed through antenna sharing devices 1001 to 1003 and transmitted from antennas 101 to 103.

On the other hand, on the terminal side, the signal is received through antenna 1804, passed through antenna sharing device 1803, amplified, frequency-converted and A/D-converted by radio reception circuit 1805. This signal is despread using the same spreading codes as those used for spreading according to a spread spectrum communication system by correlator (or matched filter) 1806. The despread signal is sent to timing detection section 1808. The timing detection section calculates the power of the correlator output and detects time t0 at which the power is great. This timing t0 is sent to decimation section 1809. The decimation section sends the received signal of timing t0 to demodulator 1810. The demodulator demodulates and outputs the received signal.

Thus, in the communication apparatus based on the spread spectrum system, one communication apparatus comprises a transmission/reception section using an adaptive array antenna, which calculates a weighting coefficient with a new directivity pattern from the weighting coefficient of the received signal combined by the adaptive array antenna and selects it from the results of the reception power of the desired wave and the reception power SIR as the weighting coefficient for transmission and transmits it, which gives the following effects:

(1) If there is no significant difference in the power of the desired wave, transmission focused on the direction with an optimal SIR makes it possible to reduce interference with other stations, improving the utilization efficiency of radio spectrum. In the CDMA system, it can also increase the system capacity.

(2) If there is a significant difference in the reception power of the desired wave, transmission focused on the direction corresponding to the maximum reception power of the desired wave makes it possible to improve the reception power of the desired wave of the communication counterpart (terminal).

(Embodiment 19)

Embodiment 19 is explained using FIG. 18 and FIG. 20. This is a communication system based on a spread spectrum system made up of a communication apparatus (base station)

with the configuration in FIG. 18 and another communication apparatus (terminal) with the configuration in FIG. 20.

First, the uplink is explained. The communication terminal apparatus on its transmitting side modulates a transmission signal by modulator 1801. At this time, not only data modulation but also spreading modulation is carried out. The modulated signal is frequency-converted and amplified by radio transmission circuit 1802, passed through antenna sharing device 1803 and transmitted from antenna 1804.

The reception in the communication apparatus (base station) with the configuration in FIG. 18 is the same as that explained in Embodiment 14. A received signal is obtained through array reception by adaptive array antenna receiver 109. Selector 117 selects a weighting coefficient from the results of the reception power of the desired wave and reception SIR.

Then, the downlink is explained. The communication apparatus (base station) on its transmitting side modulates a transmission signal by modulator 1004. At this time, not only data modulation but also spreading modulation is carried out. Sum-of-products calculator 1005 multiplies the signal by weighting coefficient selected by selector 117. The multiplication result is frequency-converted and amplified by radio transmission circuit 1006, passed through antenna sharing devices 1001 to 1003 and transmitted from antennas 101 to 103.

On the other hand, on the terminal side, the signal is received through antenna 1804, passed through antenna sharing device 1803, amplified, frequency-converted and A/D-converted by radio reception circuit 1805. This signal is despread using the same spreading codes as those used for spreading according to a spread spectrum communication system by correlator (or matched filter) 1806. The despread signal is sent to timing detection section 1808. The timing detection section calculates the power of the correlator output and detects time t0 at which the power is great. This timing to is sent to decimation section 1809. The decimation section sends the received signal of timing t0 to demodulator 1810. The demodulator demodulates and outputs the received signal.

Thus, in the radio communication system based on the spread spectrum system, one communication apparatus comprises a transmission/reception section using an adaptive array antenna, which calculates a weighting coefficient with a new directivity pattern from the weighting coefficient of the received signal combined by the adaptive array antenna and selects it from the results of the reception power of the desired wave and the reception power SIR as the weighting coefficient for transmission, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the power of the desired wave but there is no significant difference in the SIR, transmission focused on the direction corresponding to the maximum reception power of the desired wave makes it possible to improve the reception power of the desired wave of the communication counterpart (terminal).

(3) If there is a significant difference in both the reception power of the desired wave and SIR, and if the large/small tendency is consistent between the reception power of the desired wave and SIR, transmission is carried out focused on the direction corresponding to the maximum reception power of the desired wave and if it is not consistent, transmission is carried out with the same directivity pattern as the reception directivity, which will prevent either the reception power of the desired wave or SIR from extremely deteriorating.

Figure 21:
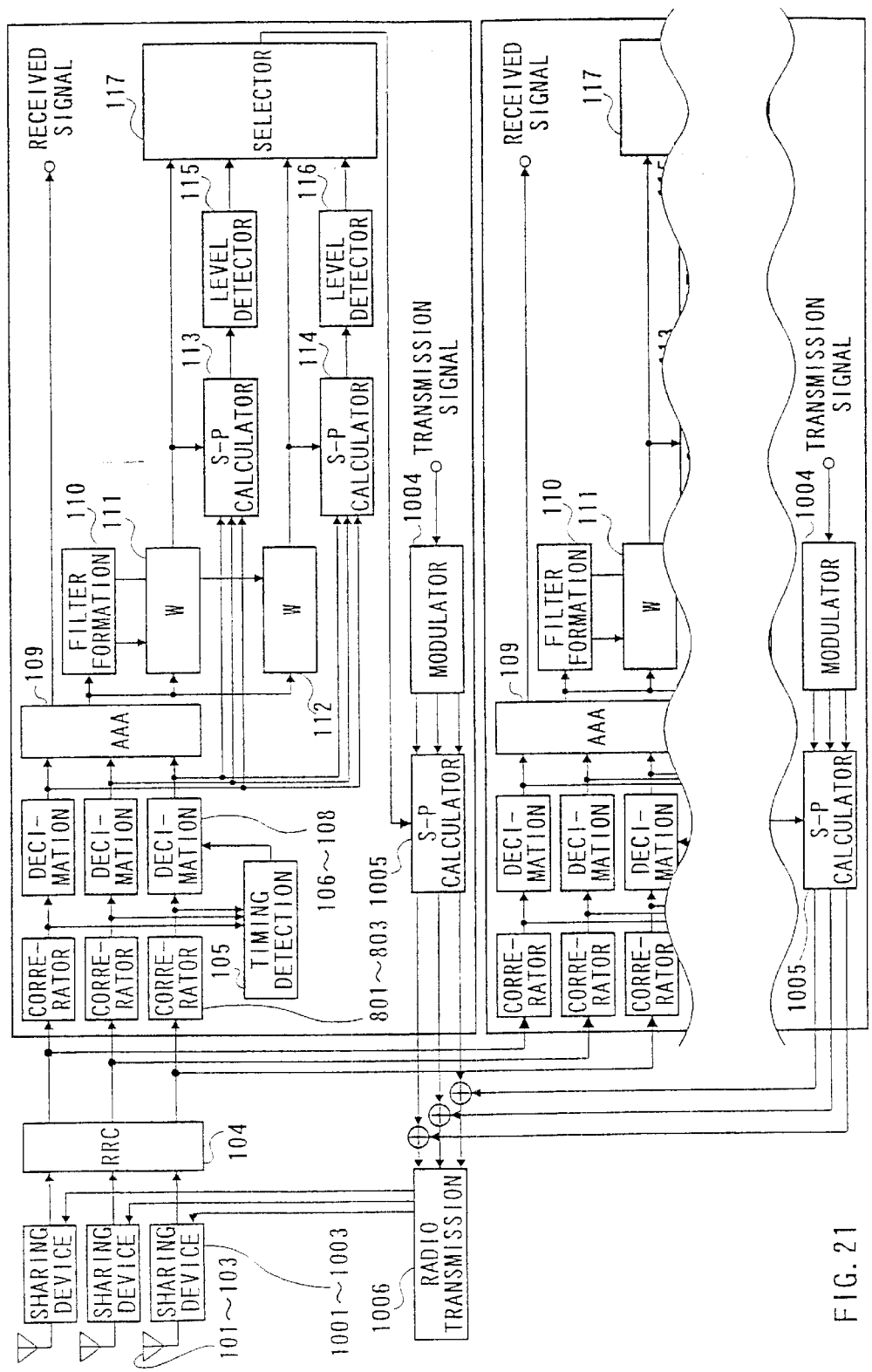
FIG. 21 is a block diagram showing a base station apparatus according to Embodiment 18 of the present invention.

The base station apparatus of the present invention can also have a two-system configuration as shown in FIG. 21.

The base station apparatuses and radio communication methods can be applied to mobile station apparatuses and base station apparatus of a radio communication system. Moreover, the base station apparatuses and radio communication methods in the embodiments above can be implemented by combining them accordingly. The present invention can be applied not only to CDMA but also to TDMA and other systems.

As described above, the base station apparatuses and radio communication methods calculate a weighting coefficient with a new directivity pattern from the weighting coefficient of the received signal combined by the adaptive array antenna, select and transmit it as the weighting coefficient corresponding to the maximum reception power of the desired wave as the weighting coefficient for transmission, focusing on the direction in which the reception power of the desired wave reaches a maximum value, which will improve the reception power of the desired wave of the communication counterpart (terminal).

Moreover, the present invention calculates a weighting coefficient with a new directivity pattern from the weighting coefficient of the received signal combined by the adaptive array antenna, selects and transmits the one with the maximum SIR as the weighting coefficient for transmission, thus focusing on the direction with an optimal SIR, which will reduce interference with other stations and contribute to more effective utilization of radio spectrum.

In addition, the present invention calculates a weighting coefficient with a new directivity pattern from the weighting coefficient of the received signal combined by the adaptive array antenna, selects it as the weighting coefficient for transmission from the results of the reception power of the desired wave and reception SIR, which gives the following effects:

(1) If there is no significant difference in the reception power of the desired wave, transmission focused on the direction with an optimal SIR makes it possible to reduce interference with other stations, improving the utilization efficiency of radio spectrum.

(2) If there is a significant difference in the reception power of the desired wave but there is no significant difference in the SIR, transmission focused on the direction corresponding to the maximum reception power of the desired wave allows improvements of the reception power of the desired wave of the communication counterpart (terminal).

(3) If there is a significant difference in both the reception power of the desired wave and SIR, and if the large/small tendency is consistent between the reception power of the desired wave and SIR, transmission is carried out focused on the direction corresponding to the maximum reception power of the desired wave and if it is not consistent, transmission is carried out with the same directivity pattern as the reception directivity, which will prevent either the reception power of the desired wave or SIR from extremely deteriorating.

Furthermore, the present invention calculates a weighting coefficient with a new directivity pattern from the weighting coefficient of the received signal combined by the adaptive array antenna, allows not only a single weighting coefficient but also a plurality of weighting coefficients to be selected from the results of the reception power of the desired wave and reception SIR for transmission, and if a plurality of weighting coefficients are selected it is allowed to calculate and transmit a weighting coefficient with directivity which combines their respective directivity patterns, which makes it possible not only to perform transmission with optimal directivity from the reception power of the desired wave and reception SIR, but also to limit comparison to one direction and if a plurality of candidates are selected, calculate weighting coefficients with combined directivity, thus reducing calculation of weighting coefficients, array reception operations, level detection and comparison, etc.

The present invention, in communications based on a spread spectrum system, further calculates a weighting coefficient with a new directivity pattern from the weighting coefficient of the received signal combined by the adaptive array antenna and selects and transmits the one corresponding to the maximum reception SIR as the weighting coefficient for transmission, which reduces interference with other stations, increasing the system capacity of the CDMA system.

The present invention is not limited to the above described embodiments, and various variations and modifications may be possible without departing from the scope of the present invention.

This application is based on the Japanese Patent Application No.HEI 10-105747 filed on Mar. 31, 1998 entire content of which is expressly incorporated by reference.

What is claimed is:

1. A base station apparatus comprising:
   a first directivity formation apparatus that forms a reception directivity from a received signal, said first directivity formation apparatus comprised of an adaptive array antenna receiver;
   a second directivity formation apparatus that forms at least one new directivity from the reception directivity, the at least one new directivity limited to a specific direction in which a large gain is obtained, said second directivity formation apparatus comprised of a filter formation section and a weighting coefficient operation section;
   a level detector that detects a received level in said at least one new directivity; and
   a selector that selects a transmission directivity from said at least one new directivity based on the detected received level.

2. The base station apparatus according to claim 1, further comprising a combiner that combines directivities selected in said selector.

3. The base station apparatus according to claim 2, further comprising a transmission apparatus that transmits according to said new directivity which is one of selected and combined after being selected.

4. The base station apparatus according to claim 1, wherein said level detector detects at least one of a received level of a desired wave and a signal to interference ratio.

5. The base station apparatus according to claim 1, wherein said selector selects a transmission directivity from said new directivity and the reception directivity.

6. A communication terminal apparatus that carries out a radio communication with the base station apparatus according to claim 1.

7. A radio communication method, comprising:
   forming a reception directivity from a received signal using an adaptive array antenna receiver;
   forming at least one new directivity from the reception directivity, the at least one new directivity limited to a specific directivity in which a large gain is obtained;
   detecting a received level in the at least one new directivity; and
   selecting a transmission directivity from the at least one directivity based on the detected received level.

8. The radio communication method according to claim 7, further comprising combining directivities that are selected in the selecting a transmission directivity.

9. The radio communication method according to claim 8, further comprising carrying out transmission according to the new directivity which is one of selected and combined after being selected.

10. The radio communication method according to claim 7, where in the detecting a received level, at least one of a received level of a desired wave and a signal to interference ratio is detected.

11. The radio communication method according to claim 7, where in selecting a transmission directivity, a transmission directivity is selected from the new directivity and the reception directivity.

* * * * *